(12) United States Patent
Bock et al.

(10) Patent No.: US 12,317,961 B2
(45) Date of Patent: Jun. 3, 2025

(54) ARTICLE OF FOOTWEAR HAVING A DISPLAY SYSTEM

(71) Applicant: PUMA SE, Herzogenaurach (DE)

(72) Inventors: Markus Bock, Herzogenaurach (DE); Reinhold Sussmann, Scheinfeld (DE)

(73) Assignee: PUMA SE, Herzogenaurach (DE)

( * ) Notice: Subject to any disclaimer, the term of this patent is extended or adjusted under 35 U.S.C. 154(b) by 144 days.

(21) Appl. No.: 18/228,114

(22) Filed: Jul. 31, 2023

(65) Prior Publication Data

US 2024/0041155 A1 Feb. 8, 2024

Related U.S. Application Data

(60) Provisional application No. 63/394,330, filed on Aug. 2, 2022.

(51) Int. Cl.
| | |
|---|---|
| *A43B 3/34* | (2022.01) |
| *G02F 1/167* | (2019.01) |
| *G06F 1/16* | (2006.01) |
| *G06F 3/147* | (2006.01) |
| *G09G 3/34* | (2006.01) |

(52) U.S. Cl.
CPC ............... *A43B 3/34* (2022.01); *G02F 1/167* (2013.01); *G06F 1/163* (2013.01); *G06F 1/1637* (2013.01); *G06F 3/147* (2013.01); *G09G 3/344* (2013.01); *G09G 2354/00* (2013.01); *G09G 2360/144* (2013.01)

(58) Field of Classification Search
CPC ........... A43B 3/34; A43B 3/0078; A43B 3/38; A43B 3/40; A43B 23/24; G02F 1/167; G06F 1/163; G06F 1/1637; G06F 3/147; G09G 3/344; G09G 2354/00; G09G 2360/144; A43C 19/00
See application file for complete search history.

(56) References Cited

U.S. PATENT DOCUMENTS

| | | | | |
|---|---|---|---|---|
| 6,030,089 | A * | 2/2000 | Parker ...................... | A43B 3/44 36/137 |
| 9,392,844 | B1 * | 7/2016 | Burrell ................... | A43B 23/24 |
| 2009/0288317 | A1 * | 11/2009 | Forbes .................... | A43B 23/24 40/544 |
| 2010/0223816 | A1 * | 9/2010 | Barfield ............... | A43B 3/0078 345/87 |
| 2012/0324764 | A1 * | 12/2012 | Velez-Cruz ............ | A43B 19/00 36/137 |
| 2013/0008058 | A1 * | 1/2013 | Jasmine ................... | A43B 3/34 36/136 |
| 2015/0244126 | A1 * | 8/2015 | Carnevali ............. | G06F 1/1628 439/527 |
| 2016/0219981 | A1 * | 8/2016 | Taylor .................... | A43B 23/24 |
| 2016/0338441 | A1 * | 11/2016 | London ................... | A43B 3/36 |
| 2018/0360165 | A1 * | 12/2018 | Qiu ........................ | A43B 23/24 |
| 2024/0012915 | A1 * | 1/2024 | Andon ..................... | H04L 9/50 |

* cited by examiner

*Primary Examiner* — Quan Zhen Wang
*Assistant Examiner* — Rajsheed O Black-Childress
(74) *Attorney, Agent, or Firm* — Quarles & Brady LLP

(57) ABSTRACT

A display system for an article of footwear includes a display device with an optoelectronic display, a control module that is configured to communicate with the display device, and a power source. The display device is configured to be removably received within a receptacle formed in the article of footwear such that the optoelectronic display is visible from an outside of the article of footwear when the display device is received within the receptacle.

20 Claims, 11 Drawing Sheets

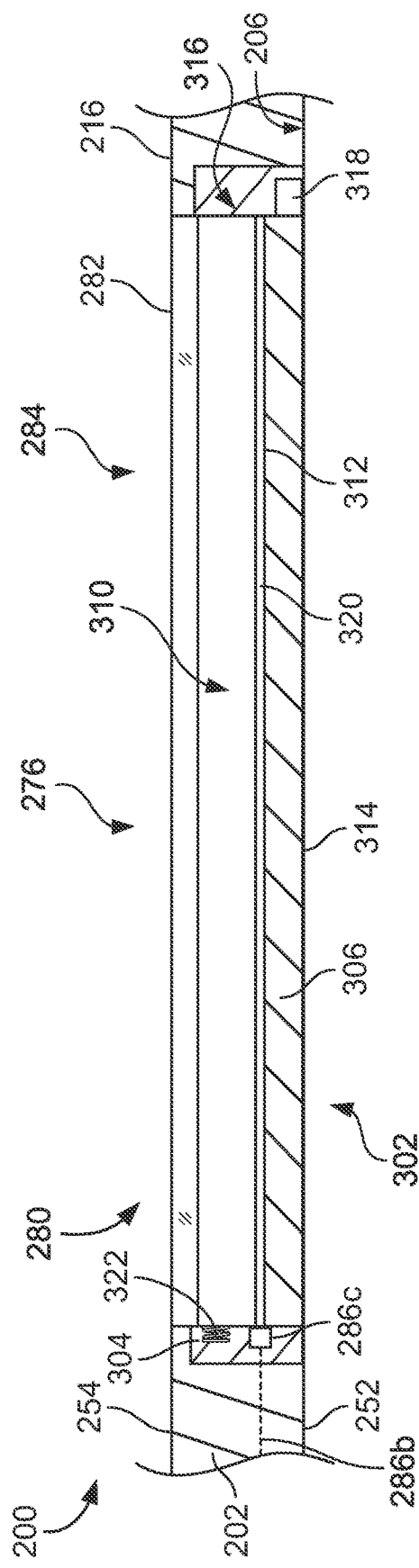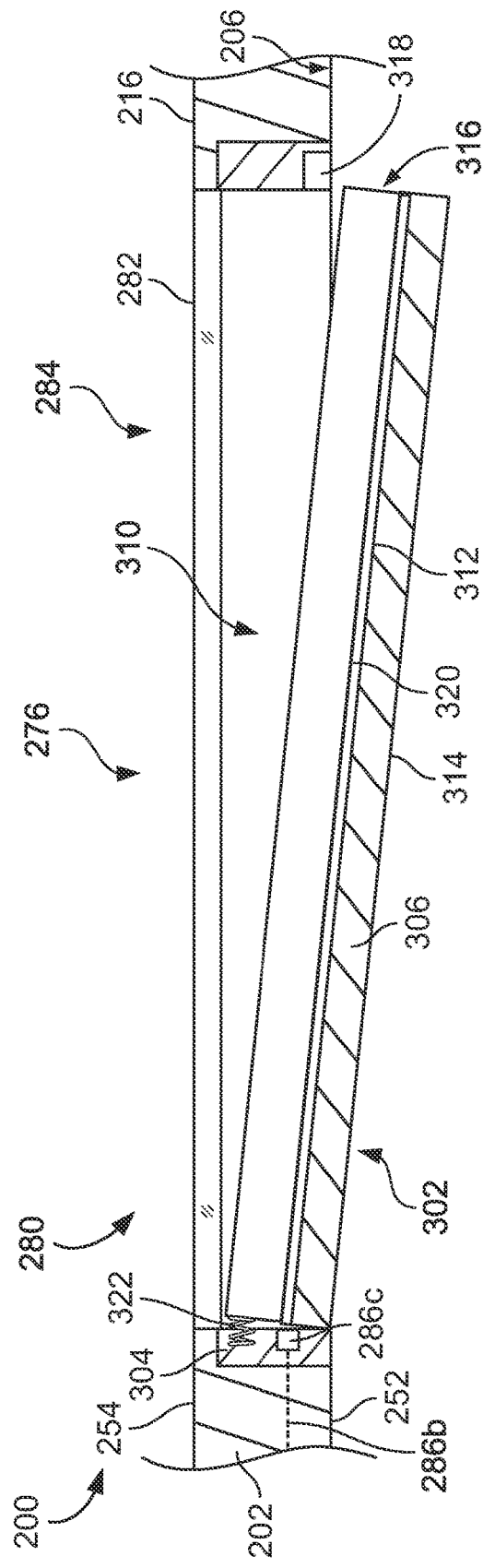

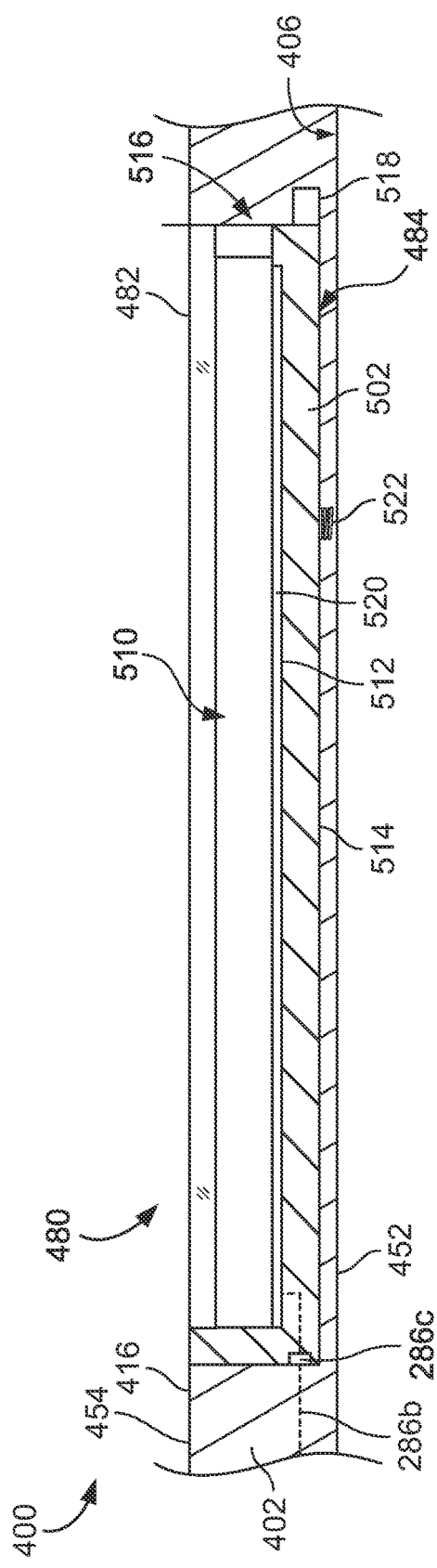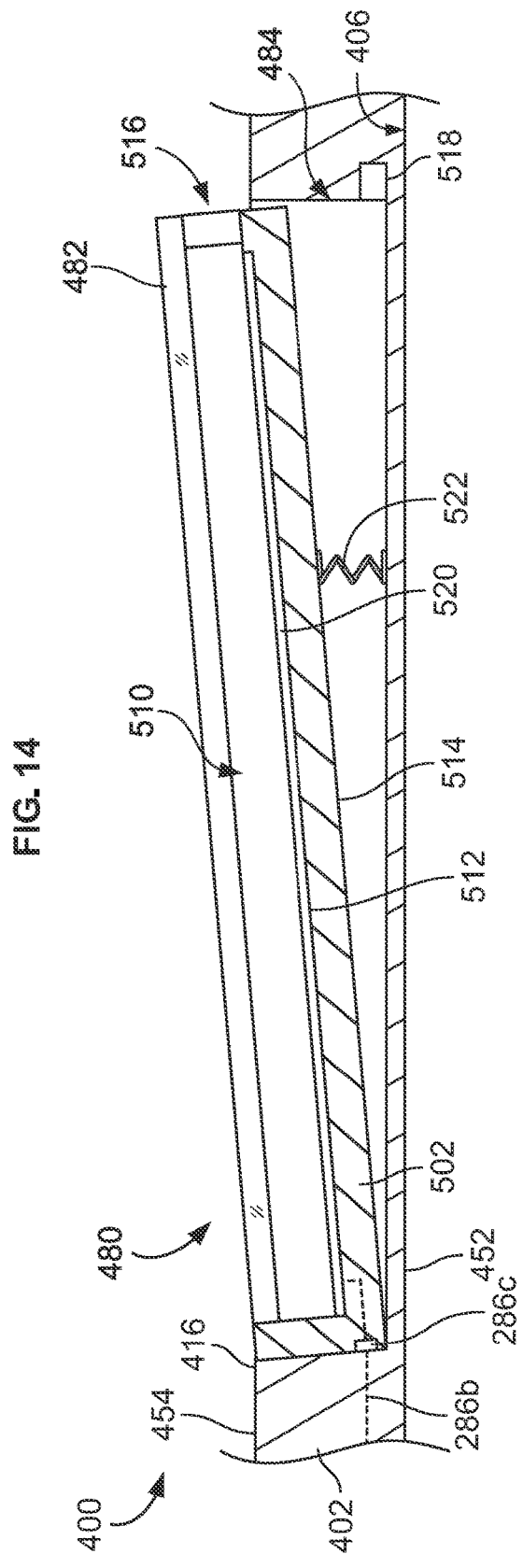

ARTICLE OF FOOTWEAR HAVING A DISPLAY SYSTEM

CROSS REFERENCE TO RELATED APPLICATIONS

This application claims the benefit of and priority from U.S. Provisional Application No. 63/394,330, filed on Aug. 2, 2022, and entitled "ARTICLE OF FOOTWEAR HAVING A DISPLAY SYSTEM," the contents of which is incorporated herein by reference in its entirety.

REFERENCE REGARDING FEDERALLY SPONSORED RESEARCH OR DEVELOPMENT

Not applicable

SEQUENCE LISTING

Not applicable

BACKGROUND

1. Field of the Invention

The present disclosure relates generally to an article of footwear having a display system, and more specifically to articles of footwear having display systems that include an optoelectronic display.

2. Description of the Background

Many conventional shoes or other articles of footwear generally comprise an upper and a sole attached to a lower end of the upper. Conventional shoes further include an internal space, i.e., a void or cavity, which is created by interior surfaces of the upper and sole, that receives a foot of a user before securing the shoe to the foot. The sole is attached to a lower surface or boundary of the upper and is positioned between the upper and the ground. As a result, the sole typically provides stability and cushioning to the user when the shoe is being worn. In some instances, the sole may include multiple components, such as an outsole, a midsole, and an insole. The outsole may provide traction to a bottom surface of the sole, and the midsole may be attached to an inner surface of the outsole and may provide cushioning or added stability to the sole. For example, a sole may include a particular foam material that may increase stability at one or more desired locations along the sole, or a foam material that may reduce stress or impact energy on the foot or leg when a user is running, walking, or engaged in another activity. The sole may also include additional components, such as plates, embedded with the sole to increase the overall stiffness of the sole and reduce energy loss during use.

The upper generally extends upward from the sole and defines an interior cavity that completely or partially encases a foot. In most cases, the upper extends over the instep and toe regions of the foot, and across medial and lateral sides thereof. Many articles of footwear may also include a tongue that extends across the instep region to bridge a gap between edges of medial and lateral sides of the upper, which define an opening into the cavity. The tongue may also be disposed below a lacing system and between medial and lateral sides of the upper, to allow for adjustment of shoe tightness. The tongue may further be manipulatable by a user to permit entry or exit of a foot from the internal space or cavity. In addition, a fastening system may allow a user to adjust certain dimensions of the upper or the sole, thereby allowing the upper to accommodate a wide variety of foot types having varying sizes and shapes.

The upper of many shoes may comprise a wide variety of materials, which may be utilized to form the upper and chosen for use based on one or more intended uses of the shoe. The upper may also include portions comprising varying materials specific to a particular area of the upper. For example, added stability may be desirable at a front of the upper or adjacent a heel region so as to provide a higher degree of resistance or rigidity. In contrast, other portions of a shoe may include a soft woven textile to provide an area with stretch-resistance, flexibility, air-permeability, or moisture-wicking properties.

However, in many cases, articles of footwear are configured with materials for visual communication and aesthetic purposes. For example, articles of footwear may include reflective materials for improving visibility of a user. Thus, there is a continuing need for articles of footwear having materials provided for visual communication and aesthetic purposes.

SUMMARY

An article of footwear, as described herein, may have various configurations. For example, an article of footwear may have an upper and a sole structure connected to the upper.

In some aspects, the present disclosure provides a display system for an article of footwear. The display system includes a display device that includes an optoelectronic display, a control module configured to communicate with the display device, and a power source. The display device is configured to be removably received within a receptacle that is formed in the footwear such that the optoelectronic display is visible from an outside of the footwear when the display device is received within the receptacle.

In some embodiments, the receptacle includes a window that is integrally formed in an upper of the footwear such that the optoelectronic display is visible through the window when the display device is received within the receptacle. In some embodiments, the receptacle includes an opening configured to receive the display device, and the receptacle is moveable relative to the window between an open position, in which the display device can be inserted or removed through the opening, and a closed position, in which the display device is secured within the receptacle adjacent to the window. In some such embodiments, when the receptacle is in the open position, the display device can be inserted within an interior cavity of the article of footwear along an interior surface of the upper and into the opening of the receptacle. In other such embodiments, when the receptacle is in the open position, the display device can be inserted into the opening of the receptacle along an exterior surface of the upper.

In some embodiments, the receptacle includes at least one electrical contact to which the display device is electrically connected when the display device is received within the receptacle. In some such embodiments, the power source is electrically connected to the at least one electrical contact of the receptacle.

In some embodiments, the optoelectronic display is an electronic paper display.

In some aspects, the present disclosure provides an article of footwear that includes a sole attached to an upper, and a display system. The display system includes a display device that includes an optoelectronic display, and a control module configured to communicate with the display device and that includes a battery. The display device is further configured to be removably received within a receptacle formed in the footwear such that the optoelectronic display is visible from an outside of the footwear. The receptacle includes at least one electrical contact that is electrically connected to the control module such that the display device is electrically connected to the at least one electrical contact when the display device is received within the receptacle.

In some embodiments, the upper includes a window that is integrally formed on an outer surface of the upper such that the optoelectronic display is visible through the window when the display device is received within the receptacle. In some such embodiments, the window is disposed on a lateral side of the upper.

In some embodiments, the control module is arranged within a midsole of the sole.

In some embodiments, the receptacle is integrally formed in the upper.

In some aspects, the present disclosure provides a display system for an article of footwear. The display system includes a display device that includes an electronic paper display, a control module configured to communicate with the display device, and a battery. The display device is arranged within a receptacle formed in the footwear such that the electronic paper display is visible from an outside of the footwear.

In some embodiments, the receptacle includes at least one electrical contact to which the display device is electrically connected when the display device is received within the receptacle.

In some embodiments, the control module is configured to provide a first electrical signal and a second electrical signal to the display device. The display device is configured such that the first electrical signal causes the electronic paper display to be in a first configuration and the second electrical signal causes the electronic paper display to be in a second configuration that is different than the first configuration.

In some embodiments, the control module is configured to receive a user input, and, in response to receiving the user input, the control module is further configured to cause the electronic paper display to change between a first configuration and a second configuration that is different than the first configuration. In some such embodiments, the display device further includes an electronic device that is configured to wirelessly couple with a wireless communication module of the control module, and the electronic device is further configured to receive the user input on a display screen of the electronic device such that a user can cause the electronic paper display to change between the first and second configurations via the display screen of the electronic device. In some such embodiments, the display system is configured such that the user can customize at least one of the first and second configurations of the electronic paper display via the display screen of the electronic device. In other such embodiments, the display screen of the electronic device provides a battery level of the battery.

Other aspects of the article of footwear, including features and advantages thereof, will become apparent to one of ordinary skill in the art upon examination of the figures and detailed description herein. Therefore, all such aspects of the article of footwear are intended to be included in the detailed description and this summary.

BRIEF DESCRIPTION OF THE DRAWINGS

FIG. 8 is a partial cross-sectional view taken along line 8-8 of FIG. 4 of the article of footwear with a receptacle in a closed position;

FIG. 9 is the partial cross-sectional view of FIG. 8 with the receptacle in an open position;

FIG. 14 is a partial cross-sectional view taken along line 14-14 of FIG. 13 of the article of footwear with a receptacle in a closed position;

FIG. 15 is the partial cross-sectional view of FIG. 14 with the receptacle in an open position;

DETAILED DESCRIPTION OF THE DRAWINGS

Figure 1:
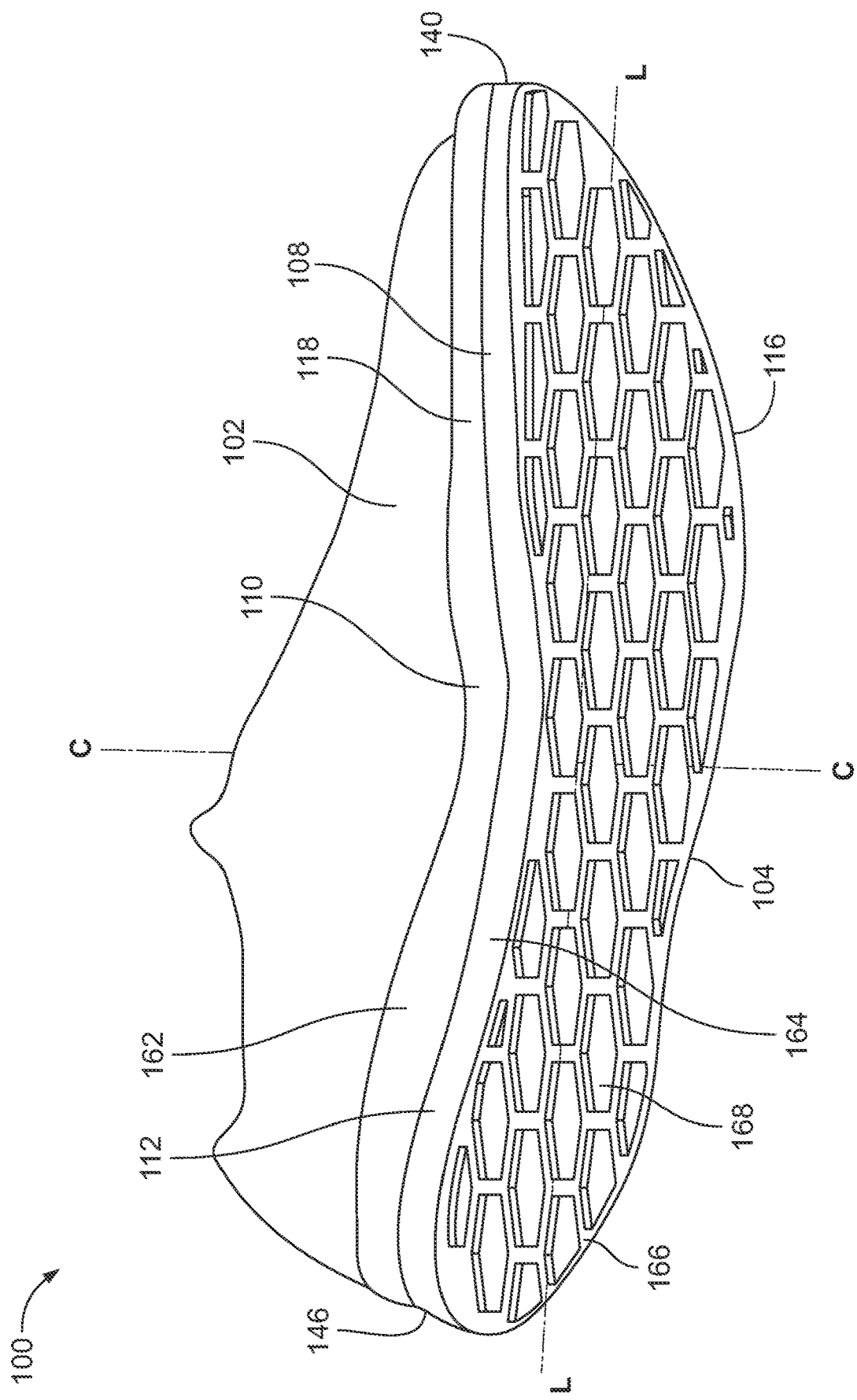
FIG. 1 is a perspective view of a bottom and medial side of an article of footwear configured as a left shoe that includes an upper and a sole structure, according to an embodiment of the disclosure.

Some aspects of the following discussion and accompanying figures disclose various embodiments or configurations of an article of footwear or a shoe. Although embodiments of a shoe are disclosed with reference to a sports shoe, such as a running shoe, tennis shoe, basketball shoe, etc., concepts associated with embodiments of the shoe may be applied to a wide range of footwear and footwear styles, including cross-training shoes, football shoes, golf shoes, hiking shoes, hiking boots, ski and snowboard boots, soccer shoes and cleats, walking shoes, and track cleats, for example. Concepts of the shoe may also be applied to articles of footwear that are considered non-athletic, including dress shoes, sandals, loafers, slippers, and heels. In addition to footwear, particular concepts described herein may also be applied and incorporated in other types of apparel or other athletic equipment, including helmets, padding or protective pads, shin guards, and gloves. Even further, particular concepts described herein may be incorporated in cushions, backpack straps, golf clubs, or other consumer or industrial products. Accordingly, concepts described herein may be utilized in a variety of products.

The term "about," as used herein, refers to variation in the numerical quantity that may occur, for example, through typical measuring and manufacturing procedures used for articles of footwear or other articles of manufacture that may incorporate aspects of embodiments of the disclosure herein; through inadvertent error in these procedures; through differences in the manufacture, source, or purity of the ingredients used to make the compositions or mixtures or carry out the methods; and the like. Throughout the disclosure, the terms "about" and "approximately" refer to a range of values±5% of the numeric value that the term precedes.

Further, as used herein, unless otherwise defined or limited, directional terms are used for convenience of reference for discussion of particular figures or examples. For example, references to "downward," or other directions, or "lower" or other positions, may be used to discuss aspects of a particular example or figure, but do not necessarily require similar orientation or geometry in all installations or configurations. The terms first, second, third, etc. may be used herein to describe various elements, components, regions, layers, and/or sections. These elements, components, regions, layers, and/or sections should not be limited by these terms. These terms may be only used to distinguish one element, component, region, layer, or section from another element, component, region, layer, or section. Terms such as "first," "second," and other numerical terms do not imply a sequence or order unless clearly indicated by the context. Thus, a first element, component, region, layer, or section discussed below could be termed a second element, component, region, layer, or section without departing from the teachings of the example configurations.

Aspects of the present disclosure are directed to an article of footwear and/or specific components of the article of footwear, such as an upper and/or a sole or sole structure. The upper may comprise a knitted component, a woven textile, and/or a non-woven textile. The knitted component may be made by knitting of yarn, the woven textile by weaving of yarn, and the non-woven textile by manufacture of a unitary non-woven web. Knitted textiles include textiles formed by way of warp knitting, weft knitting, flat knitting, circular knitting, and/or other suitable knitting operations. The knit textile may have a plain knit structure, a mesh knit structure, and/or a rib knit structure, for example. Woven textiles include, but are not limited to, textiles formed by way of any of the numerous weave forms, such as plain weave, twill weave, satin weave, dobbin weave, jacquard weave, double weaves, and/or double cloth weaves, for example. Non-woven textiles include textiles made by air-laid and/or spun-laid methods, for example. The upper may comprise a variety of materials, such as a first yarn, a second yarn, and/or a third yarn, which may have varying properties or varying visual characteristics.

The following discussion and accompanying FIGS. 1-17 disclose various embodiments or configurations of an article of footwear. The article of footwear can be provided as a pair of shoes including a first or left shoe and a second or right shoe. The left shoe and the right shoe may be similar in all material aspects, except that the left shoe and the right shoe are sized and shaped to receive a left foot and a right foot of a user, respectively. For ease of disclosure, a single shoe or article of footwear will be referenced to describe aspects of the disclosure. In some figures, the article of footwear is depicted as a right shoe, and in some figures the article of footwear is depicted as a left shoe. The disclosure below with reference to the article of footwear is applicable to both the left shoe and the right shoe. In some embodiments, there may be differences between the left shoe and the right shoe other than the left/right configuration. In some embodiments, the left shoe may include a frame, while the right shoe may not include the frame, or vice versa. Further, in some embodiments, the left shoe may include one or more additional elements that the right shoe does not include, or vice versa.

Figure 2:
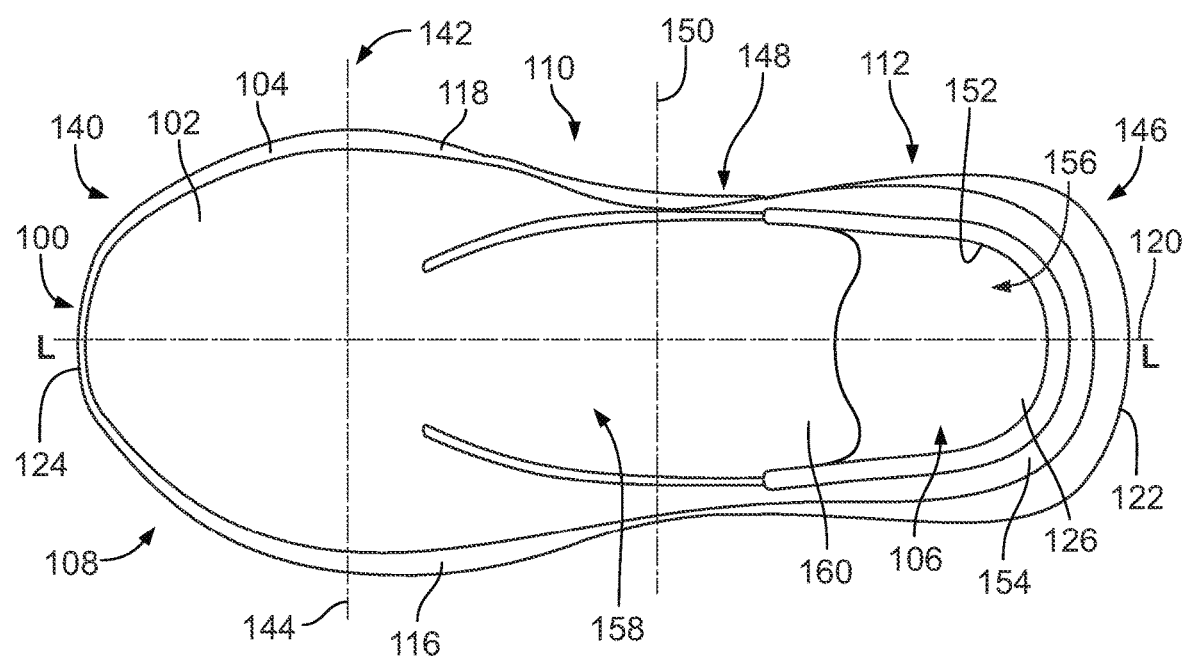
FIG. 2 is a top view of the article of footwear of FIG. 1.
Figure 3:
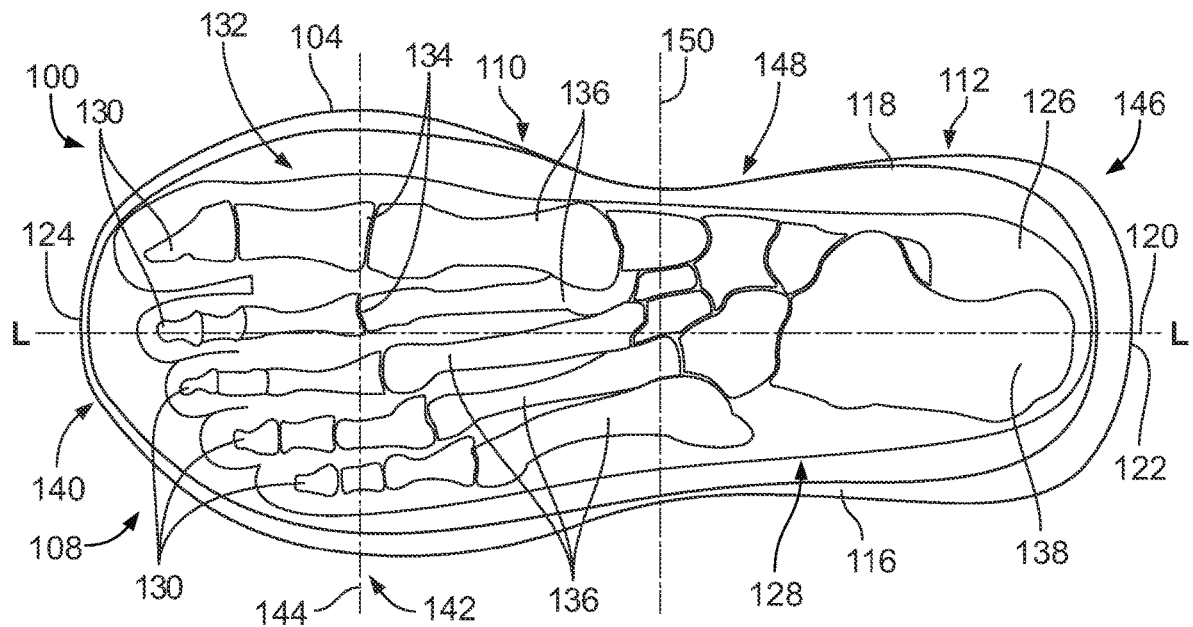
FIG. 3 is a top plan view of the article of footwear of FIG. 1 with an upper removed and a user's skeletal foot structure overlaid thereon.

Referring to FIGS. 1-3, an exemplary embodiment of an article of footwear 100 is shown, including an upper 102 and a sole structure 104. The upper 102 is attached to the sole structure 104 and together define an interior cavity 106 (see FIGS. 2 and 3) into which a user's foot may be inserted. For reference, the article of footwear 100 defines a forefoot region 108, a midfoot region 110, and a heel region 112 (see FIGS. 2 and 3). The forefoot region 108 generally corresponds with portions of the article of footwear 100 that encase portions of the foot that includes the toes, the ball of the foot, and joints connecting the metatarsals with the toes or phalanges. The midfoot region 110 is proximate and adjoining the forefoot region 108, and generally corresponds with portions of the article of footwear 100 that encase the arch of foot, along with the bridge of the foot. The heel region 112 is proximate and adjoining the midfoot region 110 and generally corresponds with portions of the article of footwear 100 that encase rear portions of the foot, including the heel or calcaneus bone, the ankle, and/or the Achilles tendon.

Many conventional footwear uppers are formed from multiple elements (e.g., textiles, polymer foam, polymer sheets, leather, and synthetic leather) that are joined through bonding or stitching at a seam. In some embodiments, the upper 102 of the article of footwear 100 is formed from a knitted structure or knitted components. In various embodiments, a knitted component may incorporate various types of yarn that may provide different properties to an upper. For example, one area of the upper 102 may be formed from a first type of yarn that imparts a first set of properties, and another area of the upper 102 may be formed from a second type of yarn that imparts a second set of properties. Using this configuration, properties of the upper 102 may vary throughout the upper 102 by selecting specific yarns for different areas of the upper 102.

With reference to the material(s) that comprise the upper 102, the specific properties that a particular type of yarn will impart to an area of a knitted component may at least partially depend upon the materials that form the various filaments and fibers of the yarn. For example, cotton may provide a soft effect, biodegradability, or a natural aesthetic to a knitted material. Elastane and stretch polyester may each provide a knitted component with a desired elasticity and recovery. Rayon may provide a high luster and moisture absorbent material, wool may provide a material with an increased moisture absorbance, nylon may be a durable material that is abrasion-resistant, and polyester may provide a hydrophobic, durable material.

Other aspects of a knitted component may also be varied to affect the properties of the knitted component and provide desired attributes. For example, a yarn forming a knitted component may include monofilament yarn or multifilament yarn, or the yarn may include filaments that are each formed of two or more different materials. In addition, a knitted component may be formed using a particular knitting process to impart an area of a knitted component with particular properties. Accordingly, both the materials forming the yarn and other aspects of the yarn may be selected to impart a variety of properties to particular areas of the upper 102.

In some embodiments, an elasticity of a knit structure may be measured based on comparing a width or length of the knit structure in a first, non-stretched state to a width or length of the knit structure in a second, stretched state after the knit structure has a force applied to the knit structure in a lateral direction. In further embodiments, the upper 102 may also include additional structural elements. In some embodiments, a heel plate or cover (not shown) may be provided on the heel region 112 to provide added support to a heel of a user. In some instances, other elements, e.g., plastic material, logos, trademarks, etc., may also be applied and fixed to an exterior surface using glue or a thermoforming process. In some embodiments, the properties associated with the upper 102, e.g., a stitch type, a yarn type, or characteristics associated with different stitch types or yarn types, such as elasticity, aesthetic appearance, thickness, air permeability, or scuff-resistance, may be varied.

Referring again to FIG. 1, the sole structure 104 is connected or secured to the upper 102 and extends between a foot of a user and the ground when the article of footwear 100 is worn by the user. The sole structure 104 may include one or more components, which may include an outsole, a midsole, a heel, a vamp, and/or an insole. In some embodiments, a sole structure may include an outsole that provides structural integrity to the sole structure, along with providing traction for a user, a midsole that provides a cushioning system, and an insole that provides support for an arch of a user. In addition, the insole may be a strobel board, a forefoot board, a lasting board, etc., or a combination thereof, and the insole may be provided between the upper 102 and the sole structure 104, or the insole may be provided as part of the upper 102.

Furthermore, the insole can be positioned within the interior cavity 106 of the upper 102, which can be in direct contact with a user's foot while the article of footwear 100 is being worn. Moreover, the upper 102 may also include a liner (not shown) that can increase comfort, for example, by reducing friction between the foot of the user and the upper 102, the sole 104, the insole, or the like, and/or by providing moisture wicking properties. The liner may line the entirety of the interior cavity 106 or only a portion thereof. In some embodiments, a binding (not shown) may surround the opening of the interior cavity 106 to secure the liner to the upper 102 and/or to provide an aesthetic element on the article of footwear 100.

Referring to FIGS. 2 and 3, the article of footwear 100 also defines a lateral side 116 and a medial side 118. When a user is wearing the shoes, the lateral side 116 corresponds with an outside-facing portion of the article of footwear 100 while the medial side 118 corresponds with an inside-facing portion of the article of footwear 100. As such, the article of footwear 100 has opposing lateral and medial sides 116, 118. The lateral and medial sides 116, 118 adjoin one another along a longitudinal central plane or axis 120 of the article of footwear 100, which is coplanar with the longitudinal axis L of FIG. 1. As will be further discussed herein, the longitudinal central plane or axis 120 may demarcate a central, intermediate axis between the lateral and medial sides 116, 118 of the article of footwear 100. Put differently, the longitudinal plane or axis 120 may extend between a rear, proximal end 122 of the article of footwear 100 and a front, distal end 124 of the article of footwear 100 and may continuously define a middle of an insole 126, the sole structure 104, and/or the upper 102 of the article of footwear 100, i.e., the longitudinal plane or axis 120 is a straight axis extending through the rear, proximal end 122 of the heel region 112 to the front, distal end 124 of the forefoot region 108.

Unless otherwise specified, and referring to FIGS. 2 and 3, the article of footwear 100 may be defined by the forefoot region 108, the midfoot region 110, and the heel region 112.

The forefoot region 108 may generally correspond with portions of the article of footwear 100 that encase portions of a foot 128 that include the toes or phalanges 130, the ball 132 of the foot 128, and one or more of the joints 134 that connect the metatarsals 136 of the foot 128 with the toes or phalanges 130. The midfoot region 110 is proximate to and adjoins the forefoot region 108. The midfoot region 110 generally corresponds with portions of the article of footwear 100 that encase an arch of the foot 128, along with a bridge of the foot 128. The heel region 112 is proximate to and adjoins the midfoot region 110. The heel region 112 generally corresponds with portions of the article of footwear 100 that encase rear portions of the foot 128, including the heel or calcaneus bone 138, the ankle (not shown), and/or the Achilles tendon (not shown).

Still referring to FIGS. 2 and 3, the forefoot region 108, the midfoot region 110, the heel region 112, the lateral side 116, and the medial side 118 are intended to define boundaries or areas of the article of footwear 100. To that end, the forefoot region 108, the midfoot region 110, the heel region 112, the lateral side 116, and the medial side 118 generally characterize sections of the article of footwear 100. Certain aspects of the disclosure may refer to portions or elements that are coextensive with one or more of the forefoot region 108, the midfoot region 110, the heel region 112, the lateral side 116, and/or the medial side 118. Further, both the upper 102 and the sole structure 104 may be characterized as having portions within the forefoot region 108, the midfoot region 110, and/or the heel region 112, and/or along the lateral side 116 and/or the medial side 118. Therefore, the upper 102 and the sole structure 104, and/or individual portions of the upper 102 and the sole structure 104, may include portions thereof that are disposed within the forefoot region 108, the midfoot region 110, and/or the heel region 112, and/or along the lateral side 116 and/or the medial side 118.

With continued reference to FIGS. 2 and 3, the forefoot region 108, the midfoot region 110, the heel region 112, the lateral side 116, and the medial side 118 are shown in detail. The forefoot region 108 extends from a toe end 140 to a widest portion 142 of the article of footwear 100. The widest portion 142 is defined or measured along a first line 144 that is perpendicular with respect to the longitudinal axis 120 that extends from a distal portion of the toe end 140 to a distal portion of a heel end 146, which is opposite the toe end 140. The midfoot region 110 extends from the widest portion 142 to a thinnest portion 148 of the article of footwear 100. The thinnest portion 148 of the article of footwear 100 is defined as the thinnest portion of the article of footwear 100 measured across a second line 150 that is perpendicular with respect to the longitudinal axis 120. The heel region 112 extends from the thinnest portion 148 to the heel end 146 of the article of footwear 100.

It should be understood that numerous modifications may be apparent to those skilled in the art in view of the foregoing description, and individual components thereof, may be incorporated into numerous articles of footwear. Accordingly, aspects of the article of footwear 100 and components thereof, may be described with reference to general areas or portions of the article of footwear 100, with an understanding the boundaries of the forefoot region 108, the midfoot region 110, the heel region 112, the lateral side 116, and/or the medial side 118 as described herein may vary between articles of footwear. However, aspects of the article of footwear 100 and individual components thereof, may also be described with reference to exact areas or portions of the article of footwear 100 and the scope of the appended claims herein may incorporate the limitations associated with these boundaries of the forefoot region 108, the midfoot region 110, the heel region 112, the lateral side 116, and/or the medial side 118 discussed herein.

Still referring to FIGS. 2 and 3, the medial side 118 begins at the distal, toe end 140 and bows outward along an inner side of the article of footwear 100 along the forefoot region 108 toward the midfoot region 110. The medial side 118 reaches the first line 144, at which point the medial side 118 bows inward, toward the central, longitudinal axis 120. The medial side 118 extends from the first line 144, i.e., the widest portion 142, toward the second line 150, i.e., the thinnest portion 148, at which point the medial side 118 enters into the midfoot region 110, i.e., upon crossing the first line 144. Once reaching the second line 150, the medial side 118 bows outward, away from the longitudinal, central axis 120, at which point the medial side 118 extends into the heel region 112, i.e., upon crossing the second line 150. The medial side 118 then bows outward and then inward toward the heel end 146, and terminates at a point where the medial side 118 meets the longitudinal, central axis 120.

The lateral side 116 also begins at the distal, toe end 140 and bows outward along an outer side of the article of footwear 100 along the forefoot region 108 toward the midfoot region 110. The lateral side 116 reaches the first line 144, at which point the lateral side 116 bows inward, toward the longitudinal, central axis 120. The lateral side 116 extends from the first line 144, i.e., the widest portion 142, toward the second line 150, i.e., the thinnest portion 148, at which point the lateral side 116 enters into the midfoot region 110, i.e., upon crossing the first line 144. Once reaching the second line 150, the lateral side 116 bows outward, away from the longitudinal, central axis 120, at which point the lateral side 116 extends into the heel region 112, i.e., upon crossing the second line 150. The lateral side 116 then bows outward and then inward toward the heel end 146, and terminates at a point where the lateral side 116 meets the longitudinal, central axis 120.

Referring still to FIGS. 2 and 3, the upper 102 extends along the lateral and medial sides 116, 118, and across the forefoot region 108, the midfoot region 110, and the heel region 112 to house and enclose a foot of a user. When fully assembled, the upper 102 also includes an interior surface 152 and an exterior surface 154. The interior surface 152 faces inward and generally defines the interior cavity 106, and the exterior surface 154 of the upper 102 faces outward and generally defines an outer perimeter or boundary of the upper 102. The upper 102 also includes an opening 156 that is at least partially located in the heel region 112 of the article of footwear 100, which provides access to the interior cavity 106 and through which a foot may be inserted and removed. In some embodiments, the upper 102 may also include an instep region 158 that extends from the opening 156 in the heel region 112 over an area corresponding to an instep of a foot to an area proximate the forefoot region 108. The instep region 158 may comprise an area similar to where a tongue 160 (see FIG. 2) of the present embodiment is disposed. In some embodiments, the upper 102 does not include the tongue 160, i.e., the upper 102 is tongueless.

In the illustrated embodiment, the sole structure 104 includes a midsole 162 and an outsole 164. The outsole 164 may define a bottom end or bottom surface 166 of the sole structure 104 across one or more of the heel region 112, the midfoot region 110, and/or the forefoot region 108. Further, the outsole 164 may be a ground-engaging portion or include a ground-engaging surface of the sole structure 104 and may be opposite of the insole thereof. As illustrated in FIG. 1, the bottom surface 166 of the outsole 164 may include a tread pattern 168 that can include a variety of shapes and configurations. The outsole 164 may be formed from one or more materials to impart durability, wear-resistance, abrasion resistance, or traction to the sole structure 104. In some embodiments, the outsole 164 may be formed from any kind of elastomer material, e.g., rubber, including thermoset elastomers or thermoplastic elastomers, or a thermoplastic material, e.g., thermoplastic polyurethane (TPU). In some embodiments, the outsole 164 may define a shore A hardness up to 95. In addition, the outsole 164 may be manufactured by a process involving injection molding, vulcanization, printing layer by layer, i.e., additive manufacturing systems or methods, and the like.

Still referring to FIG. 1, the midsole 162 may be individually constructed from a thermoplastic material, such as polyurethane (PU), for example, and/or an ethylene-vinyl acetate (EVA), copolymers thereof, or a similar type of material. In other embodiments, the midsole 162 may be an EVA-Solid-Sponge ("ESS") material, an EVA foam (e.g., PUMA® ProFoam Lite™, IGNITE Foam), polyurethane, polyether, an olefin block copolymer, organosheets, a thermoplastic material (e.g., a thermoplastic polyurethane, a thermoplastic elastomer, a thermoplastic polyolefin, etc.), or a supercritical foam. The midsole 162 may be a single polymeric material or may be a blend of materials, such as an EVA copolymer, a thermoplastic polyurethane, a polyether block amide (PEBA) copolymer, and/or an olefin block copolymer. One example of a PEBA material is PEBAX®. In some embodiments, the midsole 162 is manufactured by a process involving injection molding, vulcanization, printing layer by layer, i.e., additive manufacturing systems or methods, and the like.

In embodiments where the midsole 162 is formed from a supercritical foaming process, the supercritical foam may comprise micropore foams or particle foams, such as a TPU, EVA, PEBAX®, or mixtures thereof, manufactured using a process that is performed within an autoclave, an injection molding apparatus, or any sufficiently heated/pressurized container that can process the mixing of a supercritical fluid (e.g., $CO_2$, $N_2$, or mixtures thereof) with a material (e.g., TPU, EVA, polyolefin elastomer, or mixtures thereof) that is preferably molten. During an exemplary process, a solution of supercritical fluid and molten material is pumped into a pressurized container, after which the pressure within the container is released, such that the molecules of the supercritical fluid rapidly convert to gas to form small pockets within the material and cause the material to expand into a foam. In further embodiments, the midsole 162 may be formed using alternative methods known in the art, including the use of an expansion press, an injection machine, a pellet expansion process, a cold foaming process, a compression molding technique, die cutting, or any combination thereof. For example, the midsole 162 may be formed using a process that involves an initial foaming step in which supercritical gas is used to foam a material and then compression molded or die cut to a particular shape.

In some embodiments, the article of footwear 100 may include one or more visual display systems arranged on one or more components of the article of footwear 100, such as, e.g., the upper 102. Examples of such visual display systems or technologies may be optoelectronic displays that include, but are not limited to: electrochemical transistor based visual display technologies, liquid crystal display (LCD) panel technologies, light-emitting diode (LED) screen technologies, fiber optic technologies, electrochromographic materials (including photonic lattices or crystals), electronic paper technologies (including electrophoretic ink technologies, electrowetting technologies, or electrofluidic technologies), electroluminescent strip technologies, as well as other visual display technologies. In some embodiments, visual display portions of a display system of an article of footwear can be associated with electronic paper technologies utilizing electrophoretic ink. Several examples of such technologies are disclosed in any of the following, each of which is hereby incorporated by reference in their entirety: U.S. Pat. Nos. 7,535,624; 7,528,822; 7,420,549; 7,167,155; 7,201,952; 6,987,603; 6,922,276; 6,864,875; and 6,639,578.

In some embodiments, visual display portions of a display system of an article of footwear can be associated with flexible electronic paper technologies using electrophoretic ink, which may retain a visual display following removal of an applied power source. Several examples of such technologies are disclosed in any of the following, each of which is hereby incorporated by reference in their entirety: U.S. Pat. Nos. 8,502,788; 7,944,597; 7,675,672; 7,195,170; and 6,936,190. In some embodiments, visual display portions of a display system of an article of footwear can be associated with electronically controllable visually dynamic textiles or flexible substrates that may form portions of the article of footwear. Examples of such technologies are disclosed in U.S. Patent Publication No. 2003/0224155, the entirety of which is hereby incorporated by reference.

Figure 4:
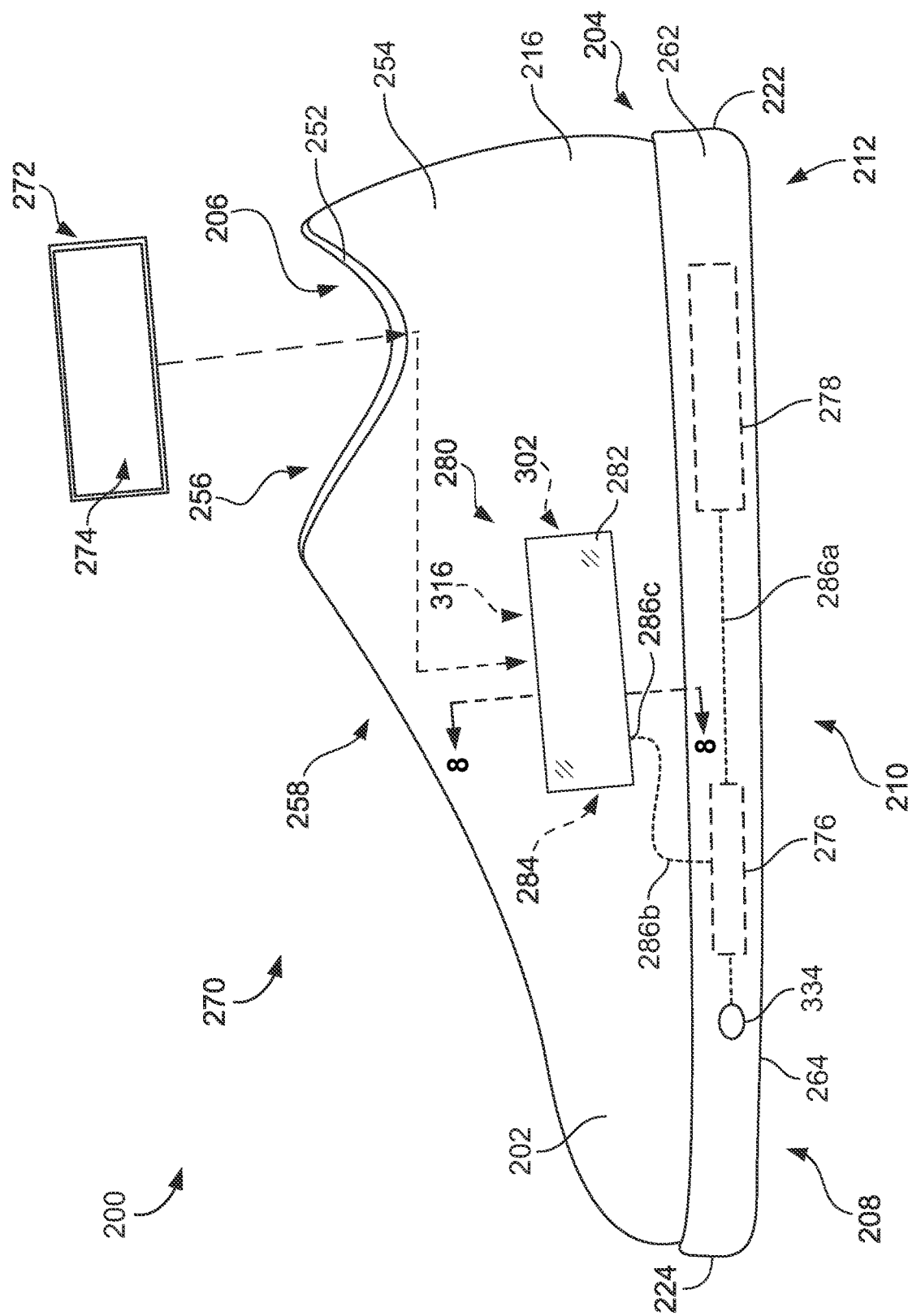
FIG. 4 is a lateral side view of an article of footwear configured as a left shoe with a display system, according to an embodiment of the disclosure.

Turning to FIG. 4, an exemplary article of footwear 200 is shown, which includes an upper 202 attached to a sole structure 204 and a display system 270. The article of footwear 200 is similar to the previous embodiment, with like elements being indicated by similar reference numerals under the "2xx" series of reference numerals. For example, the sole structure 204 of the article of footwear 200 includes a midsole 262 and an outsole 264, just as the sole structure 104 of the article of footwear 100 includes the midsole 162 and the outsole 164 (see FIG. 1).

The display system 270 of the article of footwear 200 includes a display device 272 having a display screen 274 that is configured such that the display screen 274 is generally visible from an outside of the footwear 200. The display system 270 further includes a control module 276 that is configured to communicate with the display device 272, a power source or battery 278 that is configured to power the control module 276, and a receptacle 280 having a window 282 that is configured to removably receive the display device 272. The window 282 of the receptacle 280 is arranged within a receptacle aperture 284 of the upper 202 and is configured such that the display screen 274 of the display device 272 is visible from an outside of the footwear 200 through the window 282 when the display device 272 is received within the receptacle 280. In the illustrated embodiment, the receptacle 280 is formed on a lateral side 216 of the upper 202, and thus, when the display device 272 is received within the receptacle 280, the display screen 274 is visible from the outside of the footwear 200 along the lateral side 216 of the upper 202. Further, also in the illustrated embodiment, the receptacle 280 is arranged along an interior surface 252 of the upper 202 such that the display device 272 can be inserted into the receptacle 280 by first inserting the display device 272 into an interior cavity 206 of the upper 202 via an opening 256 of the upper 202.

In some embodiments, the receptacle 280 can be configured such that the display device 272 can be inserted into and/or removed from the receptacle 280 from the outside of the footwear 200, e.g., along an exterior surface 254 of the upper 202. In some embodiments, the receptacle 280 and the window 282 thereof can be formed on other portions of the upper 202, such as, e.g., a medial side 218 or an instep region 258, or on other components of the article of footwear 200, such as, e.g., the midsole 262 of the sole structure 204. In some embodiments, the article of footwear 200 can include a plurality of receptacles 280 that are configured to receive a plurality of display devices 272 of the display system 270. In some embodiments, the single receptacle 280 can be configured to receive a plurality of display devices 272 of the display system 270. In some embodiments, the window 282 can be at least partially formed with the display device 272. For example, in such embodiments, the display screen 274 can be integrally formed with the upper 202 in place of the window 282 and the display device 272 can be configured to couple with the display screen 274 when the display device 272 is received within the receptacle 280. In some embodiments, the window 282 can comprise a translucent material. In some embodiments, the window 282 can be formed of a material having similar properties, such as, e.g., a color, a pattern, a texture, or the like, as a material comprising at least the exterior surface 254 of the upper 202.

Referring still to FIG. 4, in the illustrated embodiment, the control module 276 and the battery 278 are each disposed within the midsole 262 of the sole structure 204 of the footwear 200. More specifically, the battery 278 is arranged in a heel region 212 of the sole structure 204 toward a rear or proximal end 222 of the footwear 200 and the control module 276 is arranged in a forefoot region 208 of the sole structure 204 toward a front or distal end 224 of the footwear 200. In the illustrated embodiment, the battery 278 is electrically connected with the control module 276 via a first electrical circuit or lead 286a that extends within the midsole 262 in a midfoot region 208 of the sole structure 204. In some embodiments, the control module 276 and the battery 278 are both arranged in the heel region 212 or a midfoot region 210 of the sole structure 204. In some embodiments, at least the control module 276 may be arranged on other portions of the footwear 200, such as, e.g., along the proximal end 222 of the upper 202. In some embodiments, the control module 276 includes the battery 278. In some embodiments, the battery 278 can be configured to be wirelessly chargeable from within the sole structure 204, such as, e.g., via wireless charging coils included in the battery 278. In some embodiments, the battery 278 is configured to be chargeable via a kinetic motion converter, such as, e.g., a piezoelectric transducer, which can be arranged on the footwear 200 and in electrical communication with the battery 278. In some such embodiments, the battery 278 can include the kinetic motion convertor. In some embodiments, the footwear 200 can be configured such that the battery 278 is accessible or removable from the sole structure 204 by a user, such as, e.g., to charge or replace the battery 278.

With continued reference to FIG. 4, in the illustrated embodiment, the control module 276 can be in electrical communication with the display device 272 via a second electrical circuit or lead 286b when the display device 272 is received within the receptacle 280. More specifically, the second electrical lead 286b is electrically connected to an electrical input 286c of the receptacle 280. Thus, as discussed in greater detail below, the display device 272 can be electrically coupled with the electrical input 286c and the control module 276 can be in electrical communication with the display device 272 when the display device 272 is received within the receptacle 280 via the second electrical lead 286b. Similarly, the battery 278 can be in electrical communication with the display device 272, such as, e.g., to power the display screen 274, when the display device 272 is received within the receptacle 280 via the first and second electrical leads 286a, 286b.

In embodiments where the control module 276 includes the battery 278, both the control module 276 and the battery 278 can be in electrical communication with the display device 272 when the display device 272 is received within the receptacle 280 via only the second electrical lead 286a. In other embodiments, the battery 278 can be in electrical communication only with the control module 276, such as, e.g., to power only the control module 276 which provides electrical signals to the display device 272. In some embodiments, the second electrical lead 286b can extend from the sole structure 204 and through the upper 202, such as, e.g., between the interior and exterior surfaces 252, 254 of the upper 202 or between a first or inner layer and a second or outer layer (not shown) of the upper 202, to the electrical input 286c of the receptacle 280. In some embodiments, the second electrical lead 286b can extend from the sole structure 204 and along the interior surface 252 of the upper 202 to the electrical input 286c of the receptacle 280.

Figure 5:
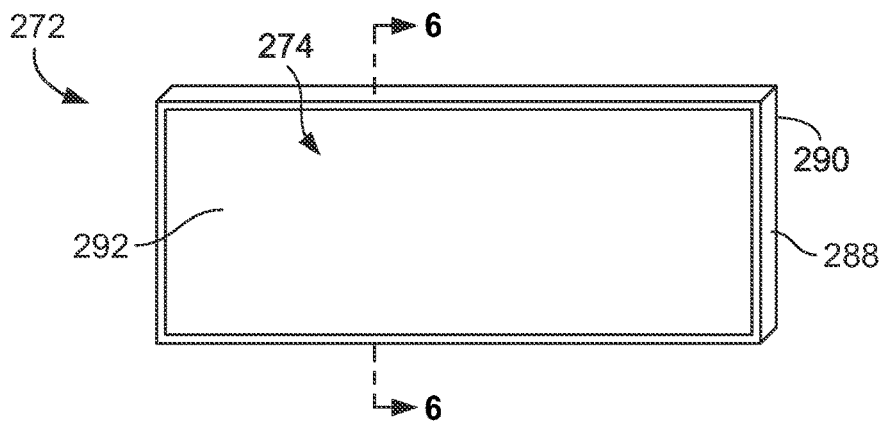
FIG. 5 is a perspective view of a display device of the display system of the article of footwear of FIG. 4.
Figure 6:
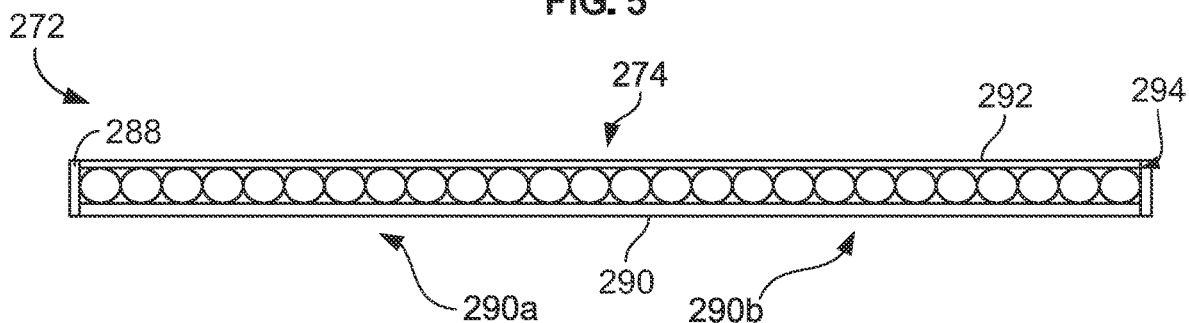
FIG. 6 is a cross-sectional view taken along line 6-6 of FIG. 5.
Figure 7:
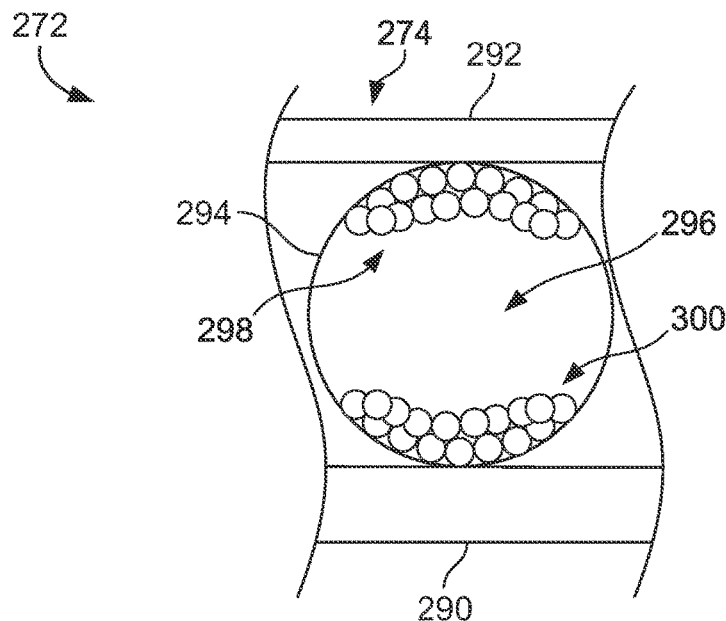
FIG. 7 is a detailed view of one of a plurality of microcapsules of the cross-sectional view of FIG. 6.

Referring now to FIGS. 5-7, the display device 272 of the display system 270 is shown in greater detail. In the illustrated embodiment, the display device 272 is configured such that the display screen 274 is an electronic paper display, i.e., an optoelectronic display utilizing electrophoretic ink technology. More specifically, the display device 272 includes a housing 288 having a first or back wall 290 and a second or front wall 292 opposite the back wall 290. Referring specifically to FIG. 6, a plurality of microcapsules 294 are arranged between the back and front walls 290, 292 to form a single layer of the plurality of microcapsules 294 such that each microcapsule 294 contacts both the back and front walls 290, 292.

Referring specifically to FIG. 7, a detailed cross-sectional view of one of the plurality of microcapsules 294 of the display device 272 is shown. In the illustrated embodiment, each microcapsule 294 has a generally transparent outer shell and is filled with a transparent fluid 296 along with a first plurality of particles 298 and a second plurality of particles 300 that are suspended in the fluid 296. The display device 272 is configured such that relative positions of the first and second pluralities of particles 298, 300 within each of the plurality of microcapsules 294 are controllable via one or more electrical signals received from the control module 276. In particular, the first plurality of particles 298 is charged to have a first electrical polarity, e.g., a negative polarity, and the second plurality of particles 300 is charged to have a second electrical polarity, e.g., a positive polarity. Thus, as discussed in greater detail below, the control module 276 can cause the first plurality of particles 298 to accumulate towards one side of the microcapsule 294 while the second plurality of particles 300 are caused to simultaneously accumulate towards another side of the microcapsule 294 opposite the first plurality of particles 298 (as shown in FIG. 7).

In addition to having differing electrical polarities, the first plurality of particles 298 can have one or more other characteristics, such as, e.g., a color, that differ from that of the second plurality of particles 300. For example, in some embodiments, the first plurality of particles 298 can be a first color and the second plurality of particles 300 can be a second color that is different than the first color. In some embodiments, at least the first plurality of particles 298 can include a first portion of particles having a first color and a second portion of particles having a second color. In some embodiments, one or more of the first and second pluralities of particles 298, 300 of one or more of the plurality of microcapsules 294 can differ from the first and second pluralities of particles 298, 300 of other microcapsules 294. For example, in some embodiments, one of the plurality of microcapsules 294 can have a first plurality of particles 298 having a first color and another of the plurality of microcapsules 294 can have a first plurality of particles 298 having a second color that is different than the first color.

Referring again to FIG. 6, in the illustrated embodiment, the front wall 292 is configured as a first or front electrode and the back wall 290 is configured as a second or back electrode. More specifically, the front wall 292 is configured as a transparent electrode and thus one of the first and second pluralities of particles 298, 300 of the plurality of microcapsules 294 may be visible through the front wall 292 depending on the relative position of the first and second pluralities of particles 298, 300 within each respective microcapsule 294. Further, as discussed in greater detail below, the back wall 290 is configured as a conductive portion or electrical contact of the display device 272 such that respective positions of the pluralities of particles 298, 300 within each respective one of the plurality of microcapsules is controllable via the control module 276. Put another way, in the illustrated embodiment, the transparent front wall 292 of the display device 272 corresponds to the display screen 274 and each of the plurality of microcapsules 294 correspond to individual segments or pixels of the display screen 274.

In some embodiments, the back wall 290 can include a plurality of conductive sections each in contact with one or more of the plurality of microcapsules 294. For example, in such embodiments, one or more microcapsules 294 in contact with one conductive section can be controlled independent of other microcapsules 294 in contact with another conductive section, such as, e.g., via different electrical signals provided to each of the plurality of conductive sections from the control module 276. In some embodiments, the back wall 290 can include a first plurality of conductive sections 290a and a second plurality of conductive sections 290b. For example, in such embodiments, the first and second pluralities of conductive sections 290a, 290b can include a first plurality of electrical leads and a second plurality of electrical leads (not shown), respectively, or a first plurality of thin film transistors and a second plurality of thin film transistors (not shown), respectively. In such embodiments, the first plurality of conductive sections 290a of the back wall 290 can contact one or more of the plurality of microcapsules 294 and the second plurality of conductive sections 290b of the back wall 290 can contact at least a portion of the remaining plurality of microcapsules 294. In such embodiments, the first plurality of conductive sections 290a can be configured to contact a first portion of each of the plurality of microcapsules 294 and the second plurality of conductive sections 290b can be configured to contact a second portion of each of the plurality of microcapsules 294.

Referring now to FIGS. 8 and 9, the receptacle 280 of the article of footwear 200 is shown in greater detail. In the illustrated embodiment, the receptacle 280 is formed in the upper 202 of the footwear 200. More specifically, the receptacle aperture 284 extends through the exterior and interior surfaces 252, 254 of the upper 202 and opens into the interior cavity 206 of the upper 202. The window 282 of the receptacle 280 is integrally formed with the exterior surface 254 of the upper 202 and covers an outer end of the receptacle aperture 284. A receptacle housing 302 is arranged within the receptacle aperture 284 adjacent to the window 282 and the interior surface 252 of the upper 202. The receptacle housing 302 includes a first or frame portion 304 that is fixedly attached to the upper 202 around a perimeter of the receptacle aperture 284, a second or base portion 306 that is pivotably moveable relative to the frame portion 304, and an interior compartment 310 defined collectively by each of the window 282, inner surfaces of the frame portion 304, and an outer surface 312 of the base portion 306. In the illustrated embodiment, the receptacle housing 302 is configured to be pivotably moveable, i.e., via movement of the base portion 306, between a closed position (as shown in FIG. 8), in which an inner surface 314 of the base portion 306 is parallel to the interior surface 252 of the upper 202 such that a receptacle opening 316 of the interior compartment 310 is closed, and an open position (as shown in FIG. 9), in which the base portion 306 is disposed at an angle relative to the frame portion 304 and the interior surface 252 of the upper 202 such that the receptacle opening 316 of the interior compartment 310 is open.

Figure 10:
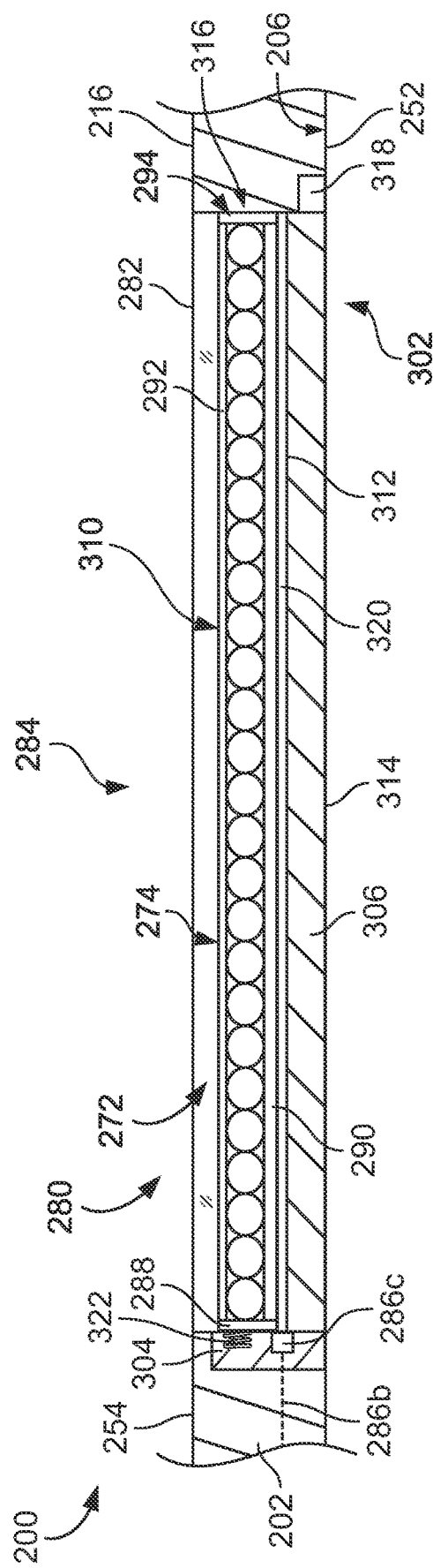
FIG. 10 is the partial cross-sectional view of FIG. 8 with the display device received within the receptacle and the receptacle in the closed position.

With continued reference to FIGS. 8 and 9, in the illustrated embodiment, the receptacle housing 302 includes a securing mechanism 318 that is configured to releasably hold the receptacle housing 302 in the closed position, e.g., by preventing movement of the base portion 306 relative to the frame portion 304. Relatedly, in some embodiments, the receptacle 280 can also include a biasing mechanism that can be configured to bias the receptacle housing 302 toward the open position when the securing mechanism 318 is released. For example, in the illustrated embodiment, the receptacle 280 includes a bias spring 322 arranged along the frame portion 304 that is configured to be compressed (as shown in FIGS. 8 and 10) when the receptacle housing 302 is moved to and secured in the closed position by the securing mechanism 318 and to be decompressed (as shown in FIG. 9) when the securing mechanism 318 is released to bias the receptacle housing 302 to the open position. In some embodiments, the securing mechanism 318 can include a button, a twist knob, or some other known structure that can be configured to cause the securing mechanism 318 to release the base portion 306 relative to the frame portion 304 and to allow the bias spring 322 to move the receptacle housing 302 from the closed position to the open position. For example, in some embodiments, the securing mechanism 318 can include a button arranged on the interior and/or exterior surfaces 252, 254 of the upper 202 that can be pressed by a user to move the receptacle housing 302 to the open position. In some embodiments, the securing mechanism 318 can be in electrical communication with the control module 276 of the display system 270. In such embodiments, the control module 276 can be configured to cause the securing mechanism 318 to release the receptacle housing 302 to the open position.

Referring still to FIGS. 8 and 9, in the illustrated embodiment, the receptacle 280 further includes a plate 320 arranged on the outer surface 312 of the base portion 306 of the receptacle housing 302 such that the plate 320 partly defines the interior compartment 310 of the receptacle 280. In the illustrated embodiment, the plate 320 is a conductive plate or an electrical contact of the receptacle 280 that is configured such that, when the receptacle 280 is in the closed position (as shown in FIG. 8), the plate 320 is electrically coupled with the electrical input 286c, and, when the receptacle 280 is in the opened position (as shown in FIG. 9), the plate 320 is electrically isolated from the electrical input 286c. In some embodiments, the receptacle 280 can be configured such that the plate 320 is electrically coupled with the electrical input 286c in each of the open and closed positions of the receptacle 280. In some embodiments, the receptacle 280 can include a plurality of plates 320 arranged along the outer surface 312 of the base portion 306 of the receptacle housing 302. In such embodiments, some of the plurality of plates 320 can also be arranged along one or more of the inner surfaces of the frame portion 304 of the receptacle housing 302. In some embodiments, the plate 320 comprises a metallic or a metallic alloy material, such as, e.g., aluminum, for exhibiting conductive properties. In some embodiments, the entire base portion 306 can be the plate 320.

Referring now to FIG. 10, the display device 272 of the display system 270 is shown inserted into the receptacle 280 of the article of footwear 200. In the illustrated embodiment, the display device 272 is configured to be inserted and removably received within the interior compartment 310 of the receptacle housing 302 when the receptacle 280 is in the open position (see FIG. 9). More specifically, the display device 272 can first be inserted into the interior cavity 206 of the upper 202 via the opening 256, i.e., while the article of footwear 200 is not worn by a user, and then inserted into the receptacle opening 316. With the display device 272 received within the interior compartment 310 of the receptacle housing 302, the receptacle 280 can be moved to the closed position (as shown in FIGS. 8 and 10) to secure the display device 272 within the receptacle 280. As shown in FIG. 10, when the display device 272 is received within the receptacle 280, the back wall 290 of the display device 272, i.e., the electrical contact of the display device 272, contacts the plate 320 of the receptacle housing 302, i.e., the electrical contact of the receptacle 280. As such, the display device 272 is in electrical communication with the control module 276 (see FIG. 4) via the second electrical lead 286b, the electrical input 286c of the receptacle 280, and the plate 320 of the receptacle housing 302. In some embodiments, the receptacle 280 can be configured to provide a seal, e.g., a dust-resistant seal, a water-resistant seal, or the like, to the interior compartment 310 when the receptacle is in the closed position.

It is contemplated that at least the display screen of the display device can have a different shape than the portion of the display device received within the interior compartment of the receptacle. For example, in some embodiments, an outer perimeter of the display screen 274 can have a first shape and at least a portion of an outer perimeter of the housing 288 of the display device 272 can have a second shape that is different than the first shape. In such embodiments, the outer perimeter of the display screen 274 can have a rounded or circular shape while the outer perimeter of the housing 288 can have a non-rounded or non-circular shape, such as, e.g., a rectangular or triangular shape. In such embodiments, the window 282 of the upper 202 of the article of footwear 200 can have a similar shape as the outer perimeter of the display screen 274 while the receptacle aperture 284 of the upper 202 can have a similar shape of the outer perimeter of the housing 288. Similarly, in such embodiments, the receptacle housing 302 can be configured such that the inner surfaces of the frame portion 304 of the receptacle housing 302 include a first or inner portion (not shown) that collectively form a first shape similar to the outer perimeter of the housing 288 of the display device 272 and a second or outer portion (not shown) that collectively form a second shape similar to the outer perimeter of the display screen 274 of the display device 272.

Figure 11:
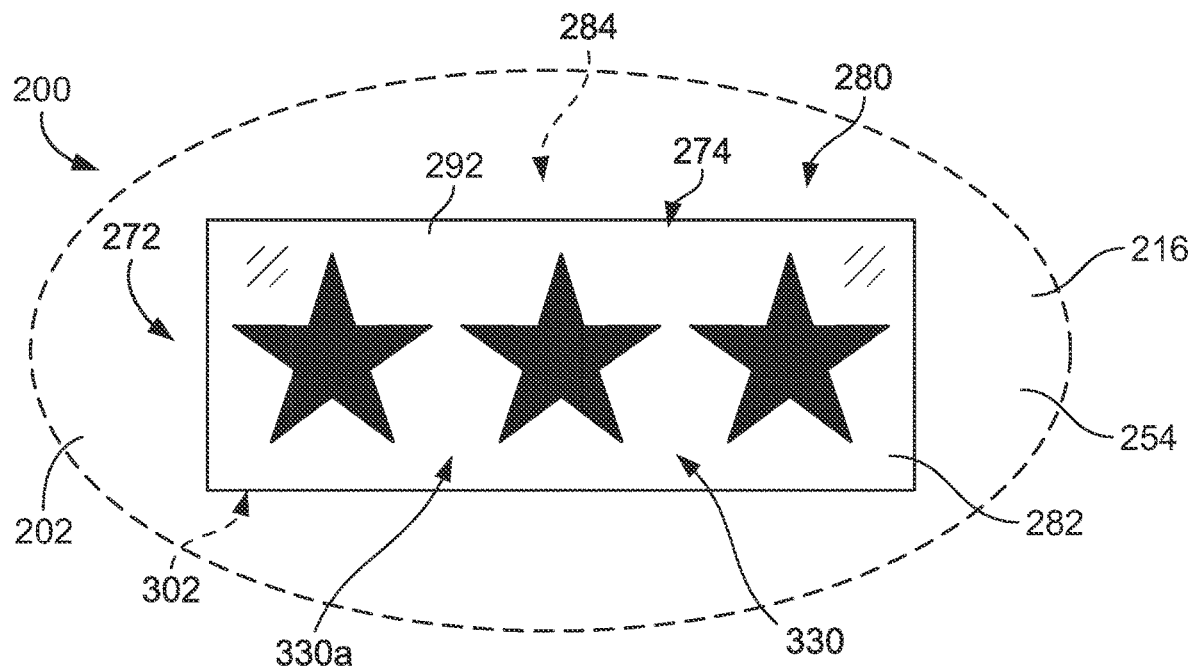
FIGS. 11 and 12 are detailed views of a window of the article of footwear of FIG. 4 with the display device displaying a first display visual and a second display visual, respectively.
Figure 12:
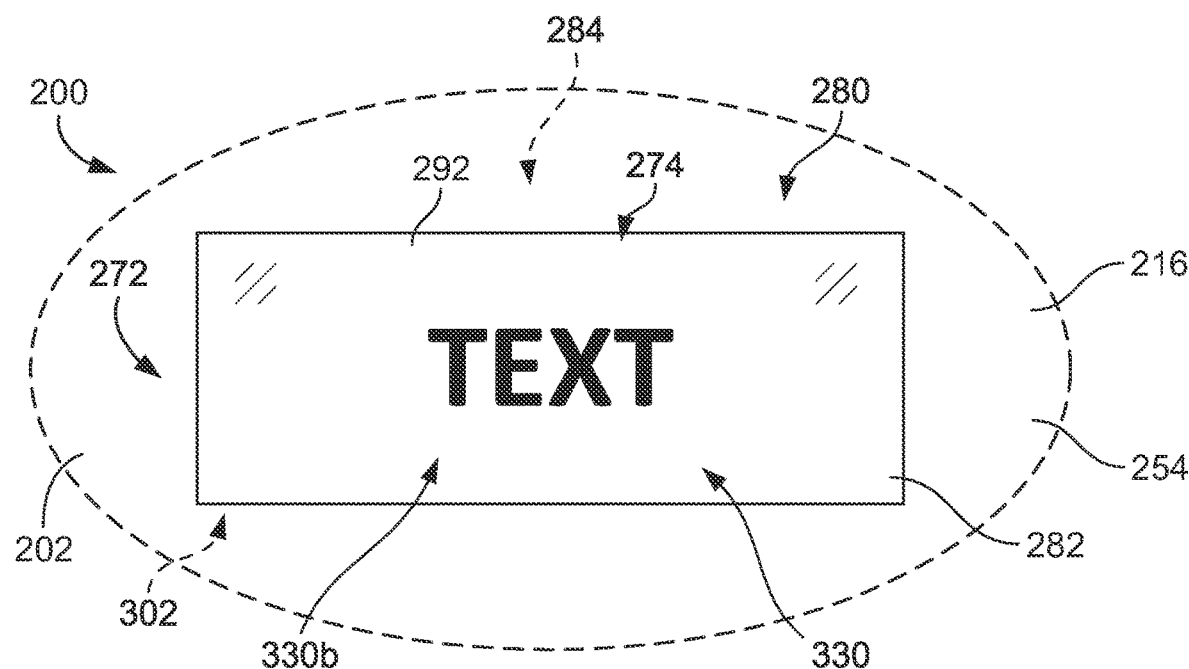

Referring now to FIGS. 11 and 12, in the illustrated embodiment, the display system 270 is configured to display one or more display visuals 330 on the display screen 274 of the display device 272 that is visible from the lateral side 216 of the article of footwear 200 through the window 282. The one or more display visuals 330 can be a variety of visual forms, such as, e.g., colors, images, symbols, text, animations, videos, etc. In particular, and referring again to FIG. 7, the display visual 330 is caused to be displayed on the display screen 274, i.e., the transparent front wall 292, of the display device 272 when one of a positive electrical field or a negative electrical field is applied to one or more portions of the back wall 290, i.e., the electrical contact, of the display device 272. When the positive or negative electrical field is applied to the back wall 290, one of the first or second pluralities of particles 298, 300 suspended in each of the plurality of microcapsules 294 is caused to move toward the front wall 292 while the other plurality of particles 298, 300 within the same microcapsules 294 is caused to simultaneously move toward the back wall 290. For example, when a negative electrical field is applied to a first portion of the back wall 290 of the display device 272, the first plurality of positively charged particles 298 suspended in each of the plurality of microcapsules 294 that contact the first portion of the back wall 290 will move toward the back wall 290 while the second plurality of negatively charged particles 300 will move toward the front wall 292 and are thus visible through the transparent front wall 292. Therefore, the display visual 330 can be displayed on the display screen 274 by selectively applying a positive or negative electrical field to corresponding portions of the back wall 290 of the display device 272, which causes either of the first or second pluralities of particles 298, 300 to be visible as portions or pixels of the display screen 274.

Referring again to FIG. 10, in the illustrated embodiment, the control module 276 (see FIG. 4) is configured to selectively provide one or more electrical signals to apply the positive or negative electrical fields to the back wall 290 of the display device 272 via the plate 320 through the electrical input 286c. As such, the control module 276 can be configured to cause, via the one or more electrical signals, the display device 272 to display the one or more display visuals 330, which correspond to one or more configurations of the first and second pluralities of particles 298, 300 of each of the plurality of microcapsules 294. For example, the control module 276 can be configured to cause a first display visual 330a (as shown in FIG. 11) to be displayed on the display screen 274 by providing a first electrical signal that results in the first and second pluralities of particles 298, 300 of the plurality of microcapsules 294 moving to a first configuration that correspond to the first display visual 330a, i.e., a particular arrangement of one of the plurality of particles 298, 300 within each microcapsule 294 being displayed through the front wall 292 that form the first display visual 330a. Put another way, the first electrical signal provided by the control module 276 causes a particular arrangement within each microcapsule 294 of the first plurality of particles 298 or the second plurality of particles 300 being visible through the front wall 292 that collectively form the first display visual 330a. From the first configuration, the control module 276 can be further configured to cause a second display visual 330b (as shown in FIG. 12) to be displayed on the display screen 274 by providing a second electrical signal that results in the first and second pluralities of particles 298, 300 of the plurality of microcapsules 294 moving to a second configuration that corresponds to the second display visual 330b. In some embodiments, the first and second display visuals 330a, 330b can have differing characteristics in addition to or instead of a change in symbols or text shown in FIGS. 11 and 12, such as, e.g., different colors, shades of color, or the like.

It should be appreciated that the display device 272 having the display screen 274 that is configured as an electronic paper display can be particularly beneficial to a user of the footwear 200. More specifically, in the illustrated embodiment, the display screen 274 of the display device 272 can be configured such that only a relatively brief electrical signal provided from the control module 276 is required to move the pluralities of particles 298, 300 of the display device 272 to a configuration that results in the particular display visual 330 being displayed. Further, once the pluralities of particles 298, 300 of the display device 272 are moved to the particular configuration, the pluralities of particles 298, 300 will remain in that configuration without the electrical signal being continuously supplied from the control module 276 and until another electrical signal is provided by the control module 276. Accordingly, the display device 272 can be understood as a passively controlled display, such that the display device 272 does not need to continuously draw power to maintain a static image or color and only draws power when changing the image or color, or when displaying an animation. Thus, in the illustrated embodiment, the display system 270 having the display device 272 requires minimal or no power to be consumed from the battery 278 while a display visual 330 is displayed and only a minimal amount of power to be consumed from the battery 278 to change display visuals 330, which requires the battery 278 to be charged less frequently, especially in comparison to other optoelectronic displays, e.g., LED displays.

It is contemplated that the display system 270 can be configured to display a particular display visual on the display screen 274 based on a user input signal received from at least one input device 334 (see FIG. 4) of the display system 270. For example, referring again to FIGS. 4, 11, and 12, the control module 276 can be configured to, in response to receiving a user input signal from the input device 334, cause the display device 272 to display on the display screen 274 one of two or more different display visuals 330, to cycle through two or more different display visuals 330 at a predetermined or set time interval, to change one or more characteristics one display visual 330, etc. The at least one input device 334 may be any suitable type of sensor or actuator for communicating with the control module 276 to selectively or automatically control the display device 272. For example, in some embodiments, the at least one input device 334 can be arranged on the footwear 200 and in communication with the control module 276, such as, e.g., via an electrical or mechanical connection, and can be configured to be physically manipulated by the user, such as, e.g., a button, knob, swipe panel, or other known user activated feature, such that the user can physically engage the at least one input device 334 to provide the user input signal to the control module 276. In some embodiments, the input device 334 can be a touch-activated sensor configured to sense a user's finger sliding or tapping an external surface of the input device 334 to control the display device 272. Touch-activated sensors of various types are contemplated, including a capacitive touch slide sensor, a capacitive touch tap sensor, a resistive touch slide sensor, or a resistive touch tap sensor. In some embodiments, the input device 334 can be a microphone such that sound waves of various frequencies may be detected for control of the display device 272. For example, in such embodiments, the input device 334 may be capable of voice-activation by which a user's speech can dictate "on" or "off" for controlling the display device 272. In the illustrated example, the at least one input device 334 is arranged on the midsole 262 of the sole structure 204 of the footwear 200. In some examples, the at least one input device 334 can be arranged on the upper 202 of the footwear 200, such as, e.g., along a tongue (not shown) of the upper 202 or as part of the window 282 or other portions of the receptacle 280.

In some embodiments, the at least one input device 334 (see FIG. 4) of the display system 270 is external to the article of footwear 200 and, instead, the at least one input device 334 is included in a mobile electronic device (not shown), such as, e.g., a smartphone, tablet, laptop, smartwatch or wearable electronic, special-purpose computer or device, or the like. For example, the user may access a mobile application via a smartphone for communication over a wireless communication network with the control module 276. In such embodiments, the control module 276 includes a wireless communication module or wireless transceiver operating over a short-range wireless communication network, such as, e.g., a Wi-Fi connection, a Bluetooth® connection, a radio frequency identification (RFID) or near-field communication (NFC) connection, or the like, and the user may control the display device 272 of the footwear 200 via a mobile application or widget on a display screen (not shown) of the mobile electronic device. Thus, in such embodiments, a user may be able to customize or change one or more display visuals 330 of the display device 272 by one or more user inputs on the display screen of the mobile electronic device that cause the control module 276 to adjust one or more configurations of the first and second pluralities of particles 298, 300 of each of the microcapsules 294 of the display device 272 via electronic signals provided by the control module 276. In such embodiments, the display screen of the electronic device may be able to provide operating information of the display system 270, such as, e.g., a battery level of the battery 278, to the user when the mobile electronic device is wirelessly coupled with the control module 276.

It is further contemplated that the display system 270 can be configured to display a particular display visual on the display screen 274 corresponding to one or more dynamic characteristics of the article of footwear 200. For example, in some embodiments, the control module 276 can be configured to cause a particular display visual to be displayed on the display screen 274 based on signals received from at least one sensor (not shown) of the display system 270. The at least one sensor can be any type of suitable sensor that can measure or sense one or more dynamic characteristics of the footwear 200 while worn by a user, such as, e.g., an acceleration, an orientation, a gait cycle of the user, a total distance or an amount of steps taken by the user during a particular time period, a particular activity undertaken by the user, among others.

It is still further contemplated that the display system 270 can be configured such that one of a plurality of display devices 272 having differing configurations or characteristics can operate in the display system 270 once inserted into the receptacle 280 of the article of footwear 200. For example, in the illustrated embodiment of FIG. 4, a user can remove a first display device from the receptacle 280 and insert a second display device into the receptacle 280 that has one or more configurations or one or more characteristics that are different than the first display device. In some embodiments, the display system 270 can be configured such that a user can choose the display device 272 from a plurality of display devices and thus customize the visual characteristics of the display system 270 depending on the chosen display device 272. In such embodiments, the one or more display visuals 330 can be preprogrammed for a respective display device 272. For example, in such embodiments, a display device of a particular article of footwear can have at least one preprogrammed display visual that can be unique to the particular article of footwear, i.e., the preprogrammed display visual is not programmed or programmable for other display devices of other articles of footwear. In other embodiments, the display device 272 can be configured such that one or more configurations or one or more characteristics of the display device 272 can be adjusted by a user, as described above.

It is yet further contemplated that the display screen 274 of the display device 272 can be configured as a variety of optoelectronic displays that are compatible with the display system 270. For example, in some embodiments, a first display device can have a first display screen that is configured as a optoelectronic display that is different than an optoelectronic display of a second display screen of a second display device, and each of the first and second display devices can be received within the receptacle 280. In some embodiments, a single display device 272 can include a plurality of display screens 274 that may each be configured as the same or differing optoelectronic display. For example, in some embodiments, a first display screen can be arranged on a first portion of the display device 272 and a second display screen can be arranged on a second portion of the display device 272. In such embodiments, the first display screen of the first portion of the display device 272 can be a first optoelectronic display and the second display screen of the second portion of the display device 272 can be a second optoelectronic display that is different than the first optoelectronic display. In some such embodiments, the first portion of the display device 272 can be the back wall 290 and the second portion of the display device 272 can be the front wall 292. In such embodiments, each of the back and front walls 290, 292 of the display device 272 can be both transparent and also configured to electrically couple with the plate 320 of the receptacle 280 depending on which of the first or second display screens are arranged adjacent to the window 282.

Referring to FIGS. 4-12, various components of the example article of footwear 200, including one or more components or structures of the display system 270, may be formed through additive manufacturing techniques, such as 3D printing. To that end, a number of 3D printing techniques may be implemented to form the footwear 200 having the display system 270, such as vat photopolymerization, material jetting, binder jetting, powder bed fusion, material extrusion, directed energy deposition, and/or sheet lamination. In some embodiments, the upper 202 having the integrally formed window 282 may be 3D printed as a single unitary piece. In some embodiments, the upper 202 and at least the receptacle housing 302 of the receptacle 280 may be 3D printed as a single unitary piece. In other embodiments, the receptacle 280 may be 3D printed separate from and later coupled to the upper 202. In some embodiments, one or more portions of the receptacle 280 may be 3D printed with a first material and other portions of the receptacle 280 may be 3D printed with a second material. For example, the frame portion 304 of the receptacle housing 302 may be 3D printed of a first material having flexible characteristics while the base portion 306 of the receptacle housing 302 may be 3D printed of a second material having less flexible characteristics than the first material.

Figure 13:
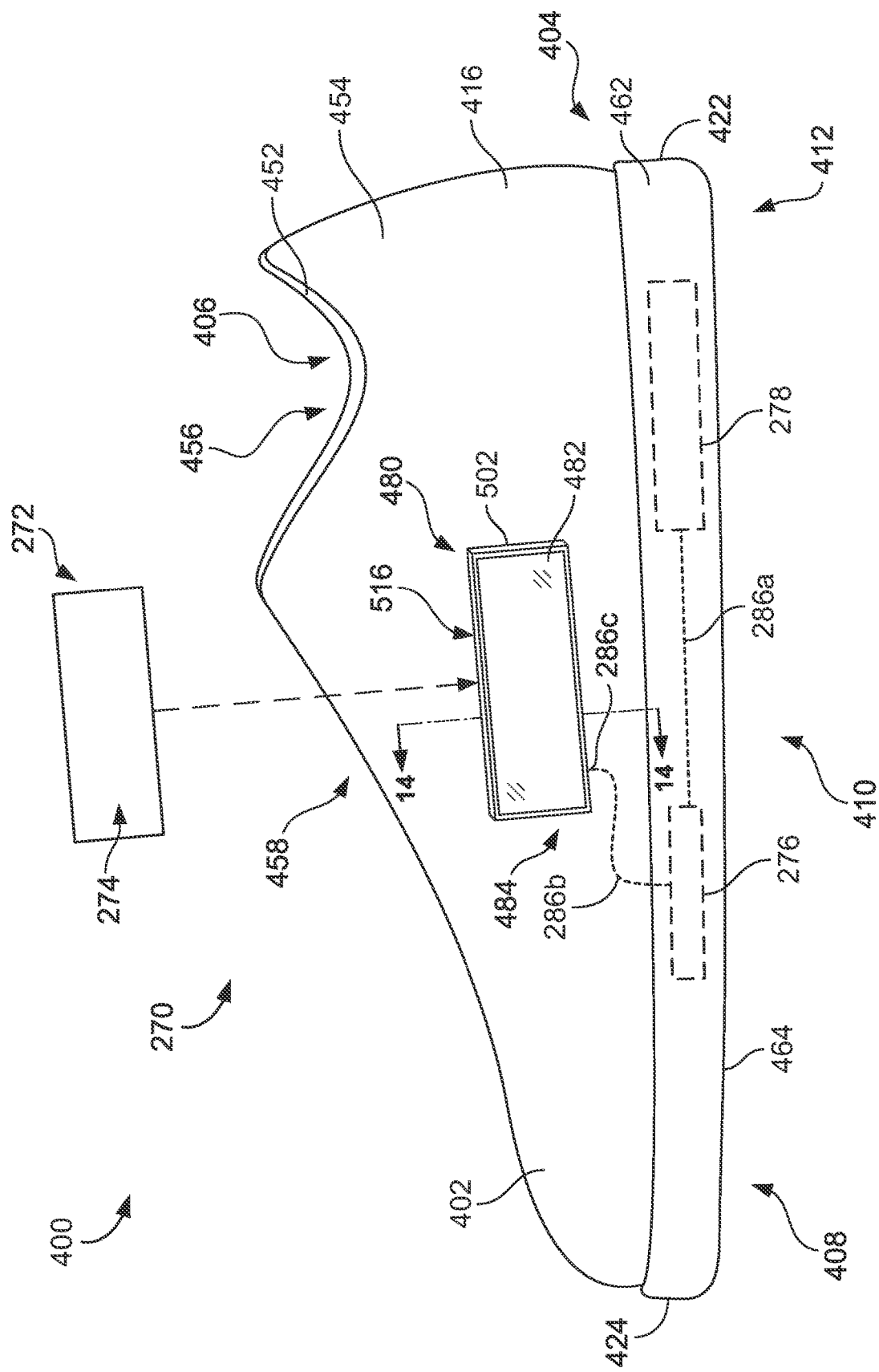
FIG. 13 is a lateral side view of an article of footwear configured as a left shoe with a display system, according to another embodiment of the disclosure.

It is further contemplated that an article of footwear having a display system can be configured such that a display device can be inserted or removed from a receptacle of the footwear from an exterior surface of the footwear, i.e., while the footwear is worn by a user. Referring now to FIGS. 13-16, another exemplary embodiment of an article of footwear 400 having the display system 270 is depicted, which includes an upper 402 attached to a sole structure 404 that includes a midsole 462 and an outsole 464. The article of footwear 400 is similar to the article of footwear 200, with like elements being indicated by similar reference numerals under the "4xx" and "5xx" series of reference numerals. For example, the footwear 400 includes a receptacle 480 having a window 482 that is configured to removably receive the display device 272 of the display system 270 in a similar manner as the footwear 200 of FIGS. 4-12 having the receptacle 280 with the window 282. While the footwear 400 is similar to the footwear 200, there are some aspects that differ. In particular, in the footwear 400, the window 482 is integrally formed with a receptacle housing 502 of the receptacle 480 and the receptacle 480 is configured such that, when the receptacle 480 is in an open position (as shown in FIGS. 13 and 15), the display device 272 of the display system 270 can be inserted into a receptacle opening 516 along an exterior surface 454 of the upper 402 (see FIG. 13) of the footwear 400.

Figure 16:
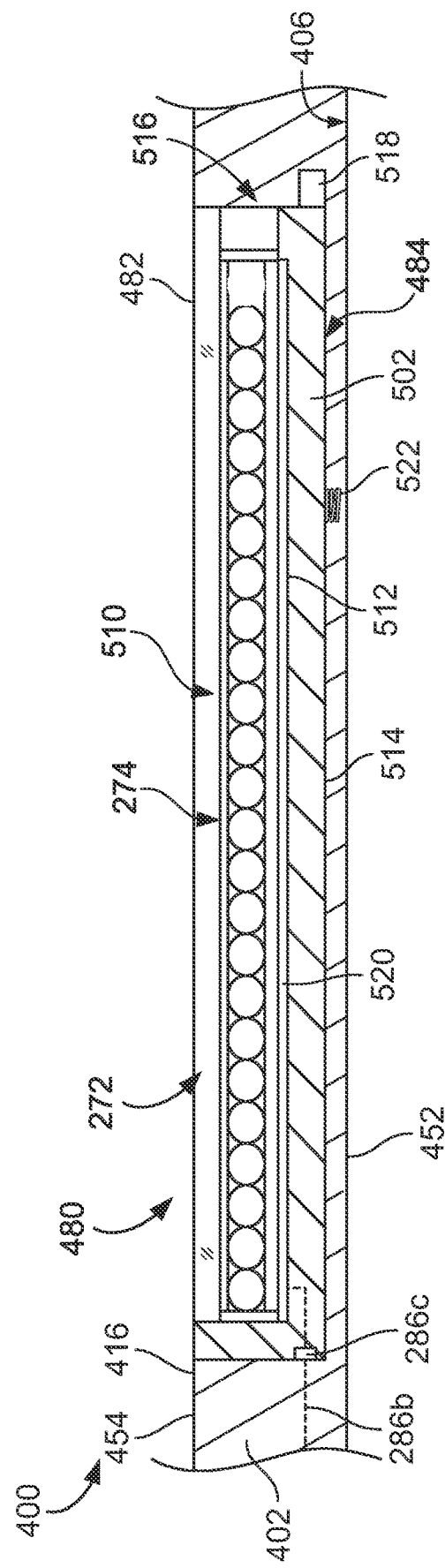
FIG. 16 is the partial cross-sectional view of FIG. 14 with the display device received within the receptacle and the receptacle in the closed position.

Referring specifically to FIGS. 14-16, in the illustrated embodiment, the upper 402 includes a receptacle pocket 484 disposed on the exterior surface 454 of a lateral side 416 of the upper 402. In particular, the receptacle pocket 484 extends into the upper 402 at a distance away from an interior surface 452 of the upper 402. The receptacle housing 502 having the integrally formed window 482 is arranged within the receptacle pocket 484 such that the receptacle housing 502 is pivotably movable relative to the receptacle pocket 484. More specifically, the receptacle housing 502 is configured to be pivotably moveable between a closed position (as shown in FIGS. 14 and 16), in which the window 482 is parallel to the exterior surface 454 of the upper 402 with an inner surface 514 of the receptacle housing 502 contacting a bottom surface of the receptacle pocket 484 and the receptacle opening 516 being closed, and the open position (as shown in FIGS. 13 and 15), in which the window 482 of the receptacle 480 is disposed at an angle relative to the exterior surface 454 of the upper 402 such that the receptacle opening 516 is opened. Thus, in the illustrated embodiment, the display device 272 of the display system 270 can be inserted into or removed from the interior compartment 510 of the receptacle 480 via the receptacle opening 516 only when the receptacle 480 is in the open position. In the illustrated embodiment, the receptacle opening 516 is arranged and accessible along a top or upper side of the receptacle 480 toward the instep region 458 of the upper 402. In some embodiments, the receptacle 480 can be configured such that the receptacle opening 516 is arranged along a bottom or lower side, a first or proximal side, or a second or distal side of the receptacle 480.

In some embodiments, the receptacle 480 of the footwear 400 can include a securing mechanism configured to secure the receptacle in the closed position and a biasing mechanism that can be configured to bias the receptacle 480 toward the open position when the securing mechanism is released. For example, in the illustrated embodiment, the receptacle 480 includes a securing mechanism 518 configured to releasably hold the receptacle 480 in the closed position and a bias spring 522 arranged along the bottom surface of the receptacle pocket 484. The bias spring 522 is configured to be compressed (as shown in FIGS. 14 and 16) when the receptacle 480 is moved to and secured in the closed position by the securing mechanism 518 and to decompress (as shown in FIG. 15) when the securing mechanism 518 is released to bias the receptacle 480 to the open position. In some embodiments, the securing mechanism 518 can include a release mechanism (not shown) that is actuatable by a user to cause the securing mechanism 518 to release the receptacle from the closed position. In some such embodiments, the release mechanism can be arranged along the exterior surface 454 of the upper 402 (see FIG. 13), such as, e.g., adjacent to the window 482, and configured to be physically manipulated by a user, such as, e.g., a button, a latch, or the like. In some embodiments, the release mechanism can be in electrical communication with the control module 276 and can be configured to be actuated via signals received by the control module 276 (see FIG. 13).

Referring specifically to FIG. 16, the electrical input 286c of the display system is arranged within the receptacle 480 such that the control module 276 is in electrical communication with a plate 520 arranged on a surface 512 of the receptacle housing 502 via the second electrical lead 286b when the receptacle 480 is in the closed position. Thus, the control module 276 is in electrical communication with the display device 272 when the display device is received within the interior compartment 510 of the receptacle 480 and the receptacle 480 is in the closed position. Further, the display screen 274 of the display device 272 is visible through the integrally formed window 482 of the receptacle 480 from the lateral side 416 of the article of footwear 400 when the display device is received within the receptacle 480.

Figure 17:
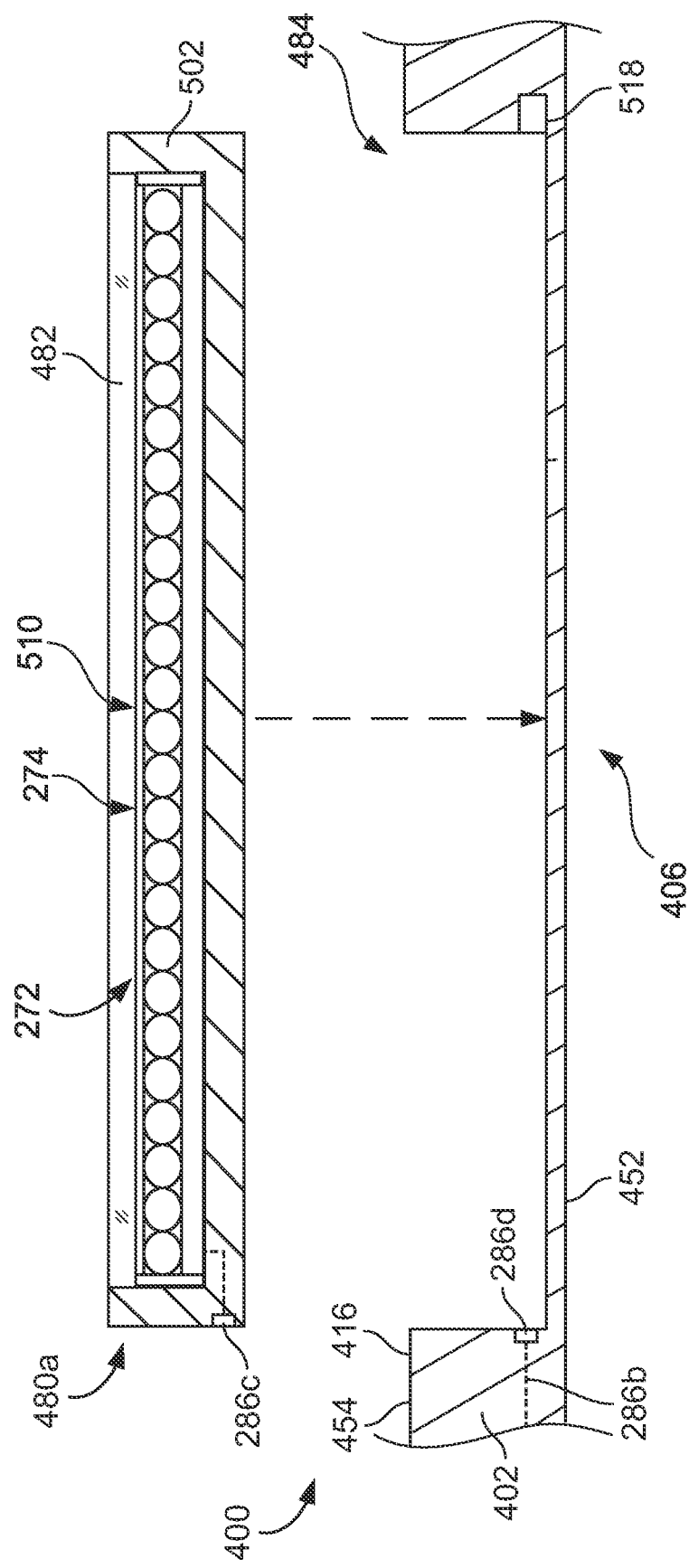
FIG. 17 is the partial cross-sectional view of FIG. 14 with another embodiment of a receptacle of the display system of the article of footwear of FIG. 13.

It is contemplated that an article of footwear having a display system can be configured such that a receptacle can be removably attachable to the footwear. Referring now to FIG. 17, an alternative embodiment of a receptacle 480a of the article of footwear 400 is depicted, which includes the display system 270. In the illustrated embodiment of FIG. 17, the display device 272 of the display system 270 is arranged within the interior compartment 510 of the receptacle housing 502 of the receptacle 480a, adjacent to the window 482, and the receptacle 480a is configured to be removably received within the receptacle pocket 484 of the upper 402 of the footwear 400.

With continued reference to FIG. 17, the entire receptacle 480a can be inserted or received within the receptacle pocket 484 and removably secured within the receptacle pocket 484 by the securing mechanism 518. In the illustrated embodiment, the electrical input 286c is configured as a first electrical contact and the receptacle pocket 484 further includes a second electrical contact 286d that is in electrical communication with the control module 276 via the second electrical lead 286b. The second electrical contact 286d is configured such that the first electrical contact or electrical input 286c contacts the second electrical contact 286d when the receptacle 480a is received within the receptacle pocket 484, thereby providing electrical communication between the control module 276 and the display device 272 via the plate 520, the electrical contacts 286c, 286d, and the electrical lead 286b. In some embodiments, the electrical contacts 286c, 286d can be configured to be water-resistant or waterproof. For example, in some embodiments, the first electrical contact 286c can be a protrusion having a gasket and the second electrical contact 286d can be a recess that is configured to receive the protrusion and gasket of the first electrical contact 286c.

Thus, the article of footwear 400 having the display system 270 illustrated in FIG. 17 can provide interchangeable display devices 272 that have increased durability such that a user can more easily transport the interchangeable display devices 272 contained within the receptacles 480*a*. In addition, in some embodiments, one of a plurality of interchangeable receptacles 480*a* can have a non-translucent surface in place of the window 482 that appears similar to the exterior surface 454 of the upper 402 and thus a user can reduce the visibility of the receptacle pocket 484 from an outside of the footwear 400 when a display device 272 is not desired. In some embodiments, the receptacle 480*a* can be configured to be inserted into the receptacle pocket 484 in a first orientation, in which the window 482 is visible from the lateral side 416 of the footwear 400, and in a second orientation, in which the inner surface 514 of the receptacle 480*a* is visible from the lateral side 416 of the footwear 400 and the window 482 contacts the inner surface of the receptacle pocket 484. In some embodiments, the receptacle 480*a* can be configured such that the display device 272 is removable from the receptacle 480*a*, such as, e.g., via the window 482.

In some embodiments, the article of footwear 400 having the display system 270 can be configured such that the receptacle 480*a* can be fastened or adhered along one or more portions of the upper 402. For example, in such embodiments, the display system 270 can include a plurality of second electrical contacts 286*d* that are each in communication with one or more second electrical leads 286*b* and can be distributed about the one or more portions of the upper 402 such that the electrical input 286*c* can be in electrical communication with the control module 276 via one or more of the second electrical contacts 286*d* at various positions along the one or more portions of the upper 402. In some embodiments, second electrical contact 286*d* can be one or more portions of the upper 402 comprising a conductive fiber or yarn that forms an electrical contact pad or contact area on the exterior surface 454 of the upper 402 and behind which is a non-conductive layer of fiber or material extending to the interior surface 452 of the upper 402. In such embodiments, the display device 272 can be electrically coupled to the contact area or pad and secured within the receptacle 480*a* between the window 482 and the exterior surface 454 of the upper 402.

In some embodiments, the receptacle 480*a* and the display device 272 can configured to bend or flex in one or more directions. In such embodiments, the receptacle 480*a* may include a gasket or peripheral channel that is configured to permit the display device 272 and/or the receptacle 480*a* to deform as the upper 402 deforms due to normal use, e.g., throughout a gait cycle of the user and particularly during a toe-off subphase of the gait cycle. In such embodiments, the receptacle 480*a*, including the window 482, can comprise a material having elastomeric properties.

In other embodiments, other configurations are possible. For example, certain features and combinations of features that are presented with respect to particular embodiments in the discussion above can be utilized in other embodiments and in other combinations, as appropriate. Further, any of the embodiments described herein may be modified to include any of the structures or methodologies disclosed in connection with other embodiments. Additionally, the present disclosure is not limited to articles of footwear of the type specifically shown. Still further, aspects of the articles of footwear of any of the embodiments disclosed herein may be modified to work with any type of footwear, apparel, or other athletic equipment.

As noted previously, it will be appreciated by those skilled in the art that while the disclosure has been described above in connection with particular embodiments and examples, the disclosure is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the disclosure are set forth in the following claims.

INDUSTRIAL APPLICABILITY

Numerous modifications to the present disclosure will be apparent to those skilled in the art in view of the foregoing description. Accordingly, this description is to be construed as illustrative only and is presented for the purpose of enabling those skilled in the art to make and use the disclosure. The exclusive rights to all modifications which come within the scope of the appended claims are reserved.

We claim:

1. A display system for an article of footwear, the display system comprising:
   a display device that includes an optoelectronic display;
   a control module that is configured to communicate with the display device;
   a power source; and
   a receptacle that is configured to be received within a receptacle aperture formed in the footwear, the receptacle including a window and a receptacle housing;
   wherein the display device is configured to be removably received within an opening of the receptacle housing such that the optoelectronic display is visible from an outside of the footwear through the window when the display device is received within the receptacle, and
   wherein at least the receptacle housing is moveable relative to the footwear between an open position, in which the display device can be inserted or removed through the opening, and a closed position, in which the display device can be secured within the receptacle with the optoelectronic display adjacent to the window.

2. The display system of claim 1, wherein the window is integrally formed in an upper of the footwear such that the receptacle housing is moveable relative to the window within the receptacle aperture that is formed in the upper.

3. The display system of claim 1, wherein the optoelectronic display is a first optoelectronic display, and the display device further includes a second optoelectronic display that is different than the first optoelectronic display.

4. The display system of claim 2, wherein, when the receptacle housing is in the open position, the display device can be inserted within an interior cavity of the footwear along an interior surface of the upper and into the opening of the receptacle.

5. The display system of claim 1, wherein, when the receptacle housing is in the open position, the display device can be inserted into the opening of the receptacle along an exterior surface of the footwear.

6. The display system of claim 1, wherein the receptacle includes at least one electrical contact to which the display device is electrically connected when the display device is received within the receptacle.

7. The display system of claim 6, wherein the power source is electrically connected to the at least one electrical contact of the receptacle.

8. The display device of claim 1, wherein the optoelectronic display is an electronic paper display.

9. An article of footwear, comprising:
a sole attached to an upper; and
a display system, comprising:
- a display device that includes an optoelectronic display; and
- a control module that is configured to communicate with the display device, the control module including a battery, wherein the display device is configured to be removably received within a receptacle formed in the footwear such that the optoelectronic display is visible from an outside of the footwear when the display device is received within the receptacle, and wherein the receptacle includes at least one electrical contact that is electrically connected to the control module such that the display device is electrically connected to the at least one electrical contact when the display device is received within the receptacle.

10. The article of footwear of claim 9, wherein the upper includes a window that is integrally formed on an outer surface of the upper such that the optoelectronic display is visible through the window when the display device is received within the receptacle.

11. The article of footwear of claim 10, wherein the window is arranged on a lateral side of the upper.

12. The article of footwear of claim 9, wherein the control module is arranged within a midsole of the sole.

13. The article of footwear of claim 9, wherein the receptacle is integrally formed in the upper.

14. A display system for an article of footwear, the display system comprising:
- a display device that includes an electronic paper display;
- a control module that is configured to communicate with the display device;
- a battery that powers the control module; and
- a receptacle that is configured to attach to the footwear, the receptacle including an opening configured to receive the display device and a window, wherein the display device is configured to be removably received within the receptacle such that the electronic paper display is visible from an outside of the footwear through the window when the electronic paper display is received within the receptacle, and wherein the receptacle is moveable relative to the footwear between an open position, in which the display device can be inserted or removed through the opening, and a closed position, in which the display device can be secured within the receptacle with the electronic paper display adjacent to the window.

15. The display system of claim 14, wherein the receptacle includes at least one electrical contact to which the display device is electrically connected when the display device is received within the receptacle.

16. The display system of claim 14, wherein the control module is configured to provide a first electrical signal and a second electrical signal to the display device, and wherein the display device is configured such that the first electrical signal causes the electronic paper display to be in a first configuration and the second electrical signal causes the electronic paper display to be in a second configuration, the second configuration being different than the first configuration.

17. The display system of claim 14, wherein the control module is configured to receive a user input, and wherein, in response to receiving the user input, the control module is further configured to cause the electronic paper display to change between a first configuration and a second configuration, the second configuration being different than the first configuration.

18. The display system of claim 17 further comprising an electronic device that is configured to wirelessly couple with a wireless communication module of the control module, wherein the electronic device is configured to receive the user input on a display screen of the electronic device such that a user can cause the electronic paper display to change between the first and second configurations via the display screen of the electronic device.

19. The display system of claim 18, wherein the display system is configured such that the user can customize at least one of the first and second configurations of the electronic paper display via the display screen of the electronic device.

20. The display system of claim 18, wherein the display screen of the electronic device provides a battery level of the battery.

* * * * *